United States Patent [19]

Yamamoto et al.

[11] Patent Number: 4,922,274
[45] Date of Patent: May 1, 1990

[54] MOTOR DRIVEN EXPOSURE ADJUSTING DEVICE

[75] Inventors: Hiroshi Yamamoto, Kanagawa; Shigeru Yoshida, Saitama; Katumi Yoshida, Saitama; Ryuji Suzuki, Kanagawa; Tadashi Arai, Saitama; Masachika Nishimura, Saitama; Hiroaki Seino, Kanagawa; Takehiko Ando, Kanagawa, all of Japan

[73] Assignee: Canon Kabushiki Kaisha/Canon Denshi Kabushiki Kaisha, Tokyo, Japan

[21] Appl. No.: 368,935

[22] Filed: Jun. 19, 1989

Related U.S. Application Data

[63] Continuation of Ser. No. 122,764, Nov. 19, 1987, abandoned.

[30] Foreign Application Priority Data

| Nov. 21, 1986 | [JP] | Japan | 61-179139 |
| Dec. 16, 1986 | [JP] | Japan | 61-194283 |
| Dec. 22, 1986 | [JP] | Japan | 61-197212 |
| Dec. 26, 1986 | [JP] | Japan | 61-309396 |

[51] Int. Cl.$^5$ .............................................. G03B 9/02
[52] U.S. Cl. .................................................. 354/271.1
[58] Field of Search ..................... 354/230, 271.1, 274

[56] References Cited

U.S. PATENT DOCUMENTS

| 4,460,253 | 7/1984 | Kawai et al. ............... 354/271.1 X |
| 4,589,750 | 5/1986 | Tomori et al. ................. 354/271.1 |
| 4,681,417 | 7/1987 | Fujimo et al. ............... 354/271.1 X |
| 4,695,144 | 9/1987 | Yoshino et al. ............. 354/271.1 X |
| 4,695,145 | 9/1987 | Kawamoto ..................... 354/271.1 |
| 4,763,150 | 8/1988 | Sumi ............................... 354/271.1 |

Primary Examiner—Michael L. Gellner
Attorney, Agent, or Firm—Fitzpatrick, Cella, Harper & Scinto

[57] ABSTRACT

A motor-driven type exposure adjusting device, such as a diaphragm-shutter device, adapted for a lens incorporating camera, an interchangeable lens, or the like. In the adjusting device, a rotary member has an optical path hole formed in a central portion thereof and is arranged to control the opening and closing actions of a plurality of light shielding blades. A stepping motor servers as a drive source for the rotation of the rotary member and is disposed outside of the optical path hole, and an aperture position detecting means detects a boundary between a given maximum aperture position defined by the light shielding blades and a stopped-down aperture position of the optical path hole. The aperture position of the optical path hole is detected through the rotating angle position of a rotary wheel to which the rotation output of the rotor shaft of the stepping motor is transmitted.

15 Claims, 16 Drawing Sheets

FIG. 1

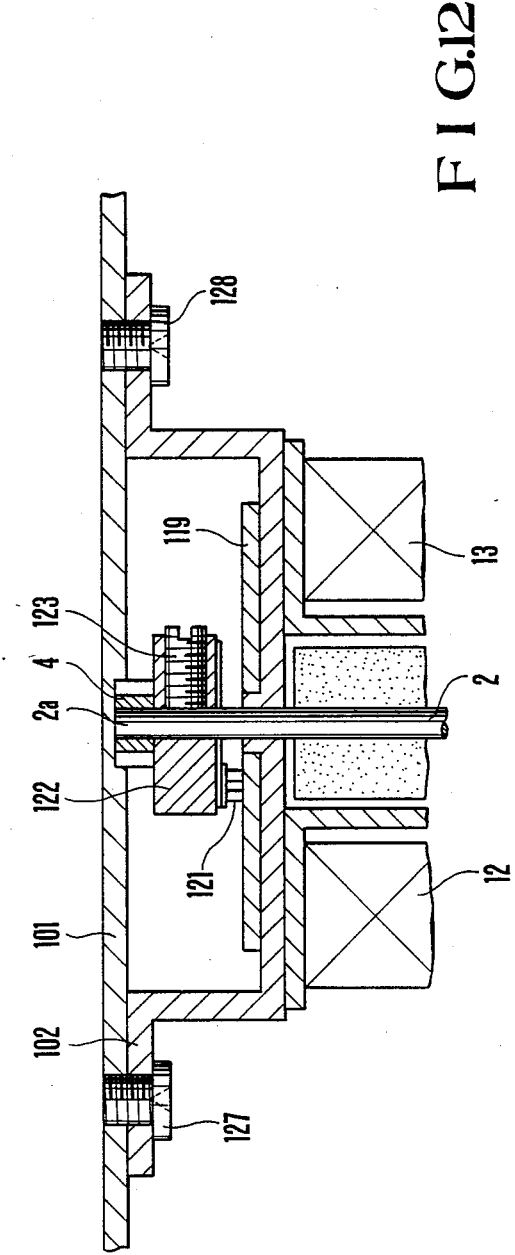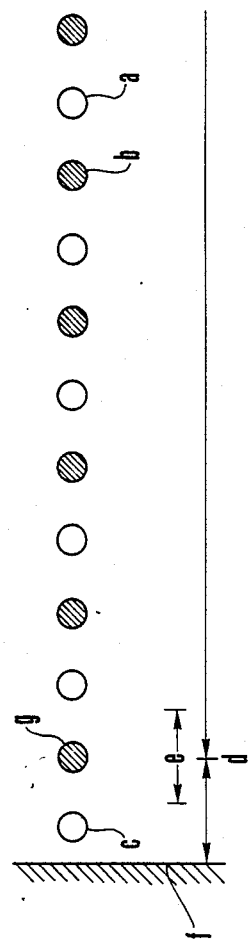

MOTOR DRIVEN EXPOSURE ADJUSTING DEVICE

This application is a continuation of application Ser. No. 122,764 filed Nov. 19, 1987, which is now abandoned.

BACKGROUND OF THE INVENTION

1. Field of the Invention

This invention relates to an exposure adjusting device such as a diaphragm or a diaphragm-shutter device adapted for use in a lens-incorporating camera, an interchangeable lens, etc.

2. Description of the Related Art

The non-interchangeable lens type 35 mm cameras are generally called compact cameras. The camera of this type is provided with an exposure device called a lens shutter device which is arranged to perform combined functions as a shutter and a diaphragm. The lens shutter devices used for the compact cameras manufactured these days are arranged to be of a direct electro-magnetically driving type. In the lens shutter device of this type, a sector ring which carries shutter blades, i.e. diaphragm blades, is arranged to serve as a rotor for the electromagnetic driving device, i.e. a motor. Meanwhile, there has been proposed, although not practicalized as yet, a lens shutter device of the kind arranged to rotate the sector ring by means of a cylindrical or ring-shaped stepping motor including a ring-shaped rotor having about the same diameter as a lens barrel in use. For example, Japanese Patent application Laid-Open No. SHO 58-17428 discloses a lens shutter device of this kind.

These known lens shutter devices are arranged to have the sector ring which is carrying the diaphragm or shutter blades driven by a motor connected directly to the ring. This arrangement enables the sector ring to be rotated to a desired degree of angle to a desired position without recourse to any complex mechanical device. They are, therefore, not only small in size and light in weight but also suited for electronic control arrangement.

Meanwhile, in the case of the single-lens reflex cameras of the kind using an interchangeable lens of large diameter, a focal plane shutter is disposed within a camera body while a diaphragm device is disposed within a lens barrel, that is, within the interchangeable lens. The diaphragm device is arranged to be mechanically driven through an interlocking lever by a diaphragm driving device which is disposed within the camera body. The conventional single-lens reflex camera which is arranged in this manner necessitates a complex mechanical arrangement not only for the diaphragm driving device within the camera body but also for the internal devices of the lens barrel in association with the diaphragm device including the interlocking lever. This has increased the weight and size of the whole camera including the lens barrel. Besides, since the operating force on the diaphragm device must be transmitted through a complex mechanical force transmission device, the diaphragm device has had insufficient responsivity to control actions inadequate for electronic control.

Therefore, it has been necessary for conventional single-lens reflex cameras to reduce the weight of the whole camera by improving the diaphragm device and to have the device arranged to be capable of operating at high speed with better control responsivity. In order to obtain such a diaphragm device that is capable of meeting these requirements for a single-lens reflex camera, the device is preferably arranged to be driven directly by a motor in the same manner as in the case of the diaphragm device adapted for a compact camera.

However, the electro-magnetic driving device for the lens shutter of the conventional compact camera includes, as mentioned in the foregoing, a sector ring which carries the diaphragm blades and serves as a rotor by itself (or through an annular disc arranged to have the same diameter as the sector ring and to be in one unified body with the latter). Therefore, the rotor itself has a very large inertia. Assuming that the diameter of a rotating body is D and the gravitational acceleration thereof G, the inertial mass of the rotating body is proportional to $GD^2$. The inertial mass of the rotor of the electro-magnetic driving device which uses the sector ring of large diameter D as the rotor thereof is, therefore, very large. The driving device thus has poor control responsivity. Besides, a ring-shaped coil which is used for the stator of the driving device has an effective diameter equal to the diameter of the sector ring. It is thus impossible to obtain a high ampere turn as the number of turns cannot be increased. Therefore, while the driving device is usable as a diaphragm driving motor for the compact camera having a small aperture lens, it has been hardly possible to use the arrangement of it as a motor for a large aperture diaphragm device of a single-lens reflex camera. Assuming that a motor is designed for a diaphragm device of a large aperture to have the same structural arrangement as the above stated electro-magnetic driving device, the magnetomotive force does not increase in proportion to the great increase of the inertial mass of the rotor. Therefore, it becomes difficult to start the rotor. The device tends to come out of step and the rotor then would fail to rotate and remain vibrating in its halting position.

It is thus apparent that the motor driven diaphragm device for a large aperture lens cannot be arranged in the same manner as the conventional lens shutter device adapted for a compact camera.

The present applicant has previously filed U.S. Pat. Nos. 4,763,150 and 4,695,145 for diaphragm devices having large apertures. The same applicant also has U.S. Pat. No. 4,681,417 for the arrangement of a maximum aperture detection switch. Further, the same applicant has also filed U.S. Pat. application Ser. No. 035,453 (Apr. 7, 1987) for a motor driven type diaphragm device which is of the same kind as the device of the present invention.

SUMMARY OF THE INVENTION

It is an object of this invention to provide a motor driven exposure adjusting device which is applicable to a lens having a large aperture and is capable of accurately detecting the opening state of an optical path hole arranged to be openable and closable as desired.

The above and other objects and features of this invention will become apparent from the following detailed description of embodiments thereof taken in connection with the accompanying drawings.

BRIEF DESCRIPTION OF THE DRAWINGS

Figure 1:
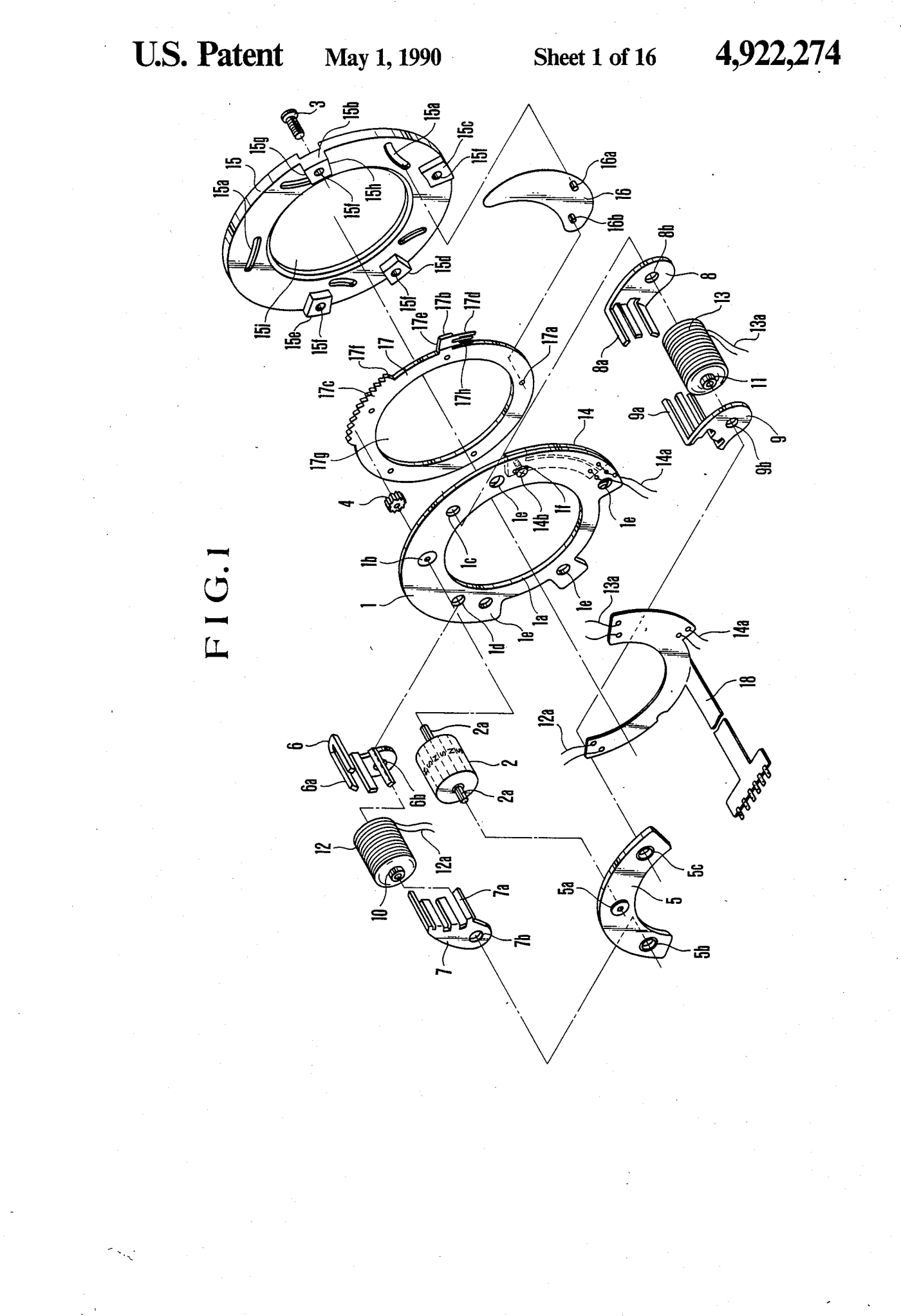

FIG. 1 an exploded oblique view showing the essential parts of a motor driven exposure adjusting device arranged according to this invention as a first embodiment thereof.

FIG. 11 is a sectional view showing the halting positions of the stepping motor of the second embodiment.

DETAILED DESCRIPTION OF THE PREFERRED EMBODIMENTS

Figure 2:
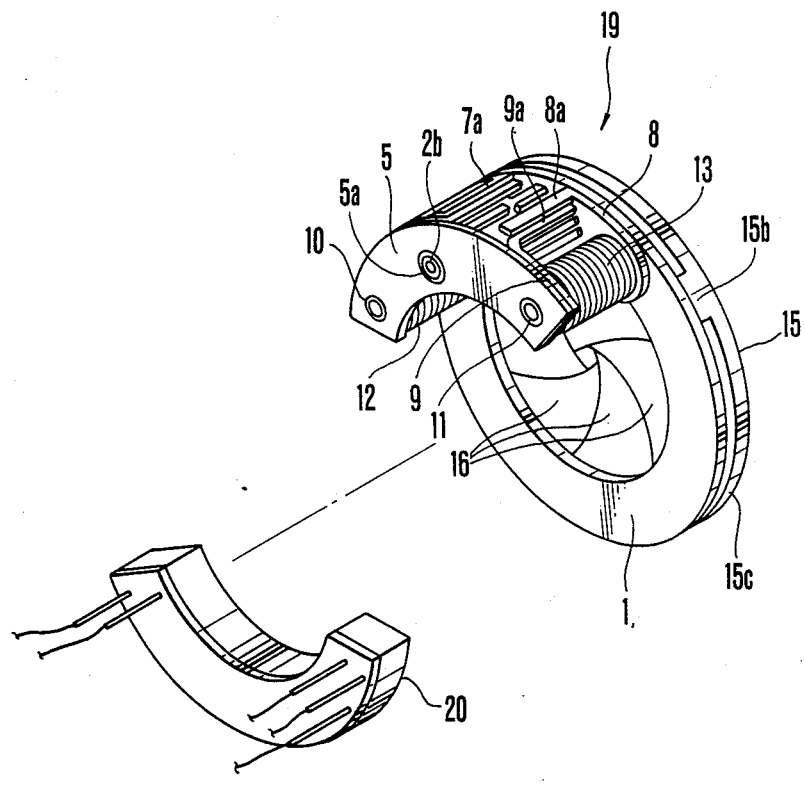
FIG. 2 oblique view showing by way of example the same device of FIG. 1 in an assembled state.

A first embodiment of this invention is described below with reference to the accompanying drawings:

FIG. 1 shows in an exploded oblique view the essential parts of a motor driven exposure adjusting device which is arranged as the first embodiment of the invention. The device comprises a rotor 2 forming a motor which is a two-phase stepping motor in this case and is arranged to drive diaphragm blades, i.e. light shielding blades; stators 6 to 9; stator exciting coils 12 and 13; a first support member 1 which is arranged to carry one end of each of the coils 12 and 13, the rotor and the stators; a cam plate 15 which is clamped and secured to the first support member 1 and is arranged to serve as a second support member; a rotary ring 17 which is rotatably carried by the cam plate 15 and is arranged to be rotated by the rotor 2; diaphragm blades 16 each of which is pivotally mounted on the rotary ring 17 and is arranged to move under the control of the cam plate 15; a conductive pattern plate 14 which is clamped and secured to one side face of the support member 1; a flexible printed circuit board 18 which is electrically connected to the coils 12 and 13 as well as to the conductive pattern plate 14; and a bearing plate 5 which are arranged to carry the other ends of the rotor 2, the stators 6 to 9 and the coils 12 and 13.

The support member 1, the cam plate 15 and the rotary ring 17 are provided with optical path holes 1a, 15i and 17g. Each of these holes has a diameter corresponding to the diameter of a photo taking lens. The support member 1 is provided with a bearing 1b which is arranged outside of the optical path hole 1a to rotatably carry one end of the shaft 2a of the rotor 2. The support member 1 also has a hole 1d which is arranged to have the iron core 10 of the coil 12 inserted and secured thereto; a hole 1c which is arranged to have the iron core 11 of the other coil 13 inserted and secured thereto; a screw hole 1e which is arranged to have the cam plate 15 secured to the support member 1 with a screw 3 screwed into the hole 1e; and a slot 1f which is arranged to make the connected position of the conductive pattern plate 14 variable relative to the support member 1.

The bearing plate 5 which is in an arcuate shape and is opposed to one side of the support member 1 at a given distance away therefrom is provided with a bearing 5a arranged to rotatably carry the other end of the shaft 2a of the rotor 2; a hole 5b which is arranged to have the iron core 10 of the coil 12 inserted and secured thereto; another hole 5c arranged to have the iron core 11 of the coil 13 inserted and secured thereto.

The rotor 2, the stators 6 to 9 and the coils 12 and 13 are disposed in between the support member 1 and the bearing plate 5 and are located within a space outside of the optical path hole 1a of the support member (or, in other words, within a space on the outside of an imaginary cylinder having the optical path hole 17a of the rotary ring 17 as its transverse section). Further, they are arranged in an arcuate shape along the peripheral edge of the optical path hole 1a. Among them, only the rotor 2 is rotatably carried by the bearings 1b and 5a. Other members, i.e. the stators 6 to 9 and the iron cores 10 and 11 of the coils 12 and 13, are carried by the support member 1 and the bearing plate 5 in such a manner that they are not rotatable nor axially movable. The stators 6 to 9 are provided with a plurality of teeth 6a to 9a which are arcuately arranged along the outer circumference of the rotor 2; and holes 6b to 9b which are arranged to have the iron cores 10 and 11 inserted and secured thereto. The stators 6 and 7 are thus fitted on the iron core 10 at their holes 6b and 7b and are stationarily carried together with the iron core 10 by the support member 1 and the bearing plate 5. Other stators 8 and 9 are fitted on the iron core 11 at their holes 8b and 9b and are stationarily carried together with the iron core 11 by the support member 1 and the bearing plate 5.

The rotor 2 is cylindrical in shape and is made of a permanent magnet. On the outer circumferential surface of the rotor are provided N pole pieces and S pole pieces, which are alternately arranged to extend in parallel in the axial direction of the rotor 2. The length of each of the N and S pole pieces in the circumferential direction is arranged to be about equal to that of each of the teeth 6a to 9a of the stators 6 to 9. The number of the N poles and that of the S poles on the outer circumferential surface of the rotor 2 is 11 respectively. In other words, 11 N pole pieces and 11 S pole pieces are alternately arranged along the circumferential surface of the rotor 2.

Figure 3A:
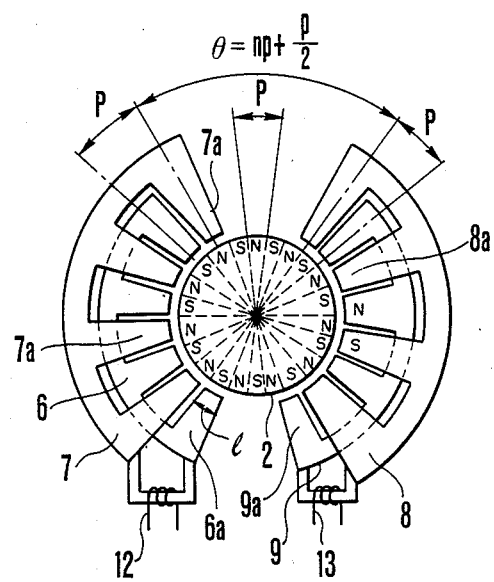
FIGS. 3(a) to 3(d) and 4 show the operation of a two-phase stepping motor which is to be mounted on the first embodiment.

As shown in FIG. 3(a), the teeth 6a of the stator 6 and the teeth 7a of the stator 7 are alternately arranged along the outer circumferential surface of the rotor 2. The teeth 8a of the stator 8 and the teeth 9a of the stator 9 are likewise alternately arranged along the outer circumferential surface of the rotor 2. The inner end face width l of the teeth of each stator (i.e. the circumferential length l of the end face of each tooth of the stators opposed to the outer circumference surface of the rotor 2) is about equal to the circumferential length of the pole piece opposed thereto. Therefore, each of the stator teeth and each of the magnetic pole piece of the rotor 2 can be squarely opposed to each other. However, in the case of this embodiment, the teeth 8a and 9a of the stators 8 and 9 are disposed in intermediate positions between the N-pole and S-pole pieces of the rotor 2 while the teeth 6a and 7a of the stators 6 and 7 are squarely opposed to the pole piece of the rotor 2 as shown in FIG. 3(a).

One end of the shaft 2a of the rotor 2 pierces the bearing 1b provided on the support member 1 to protrude from the other side of the member 1. A pinion 4 is mounted on the protrudent part of the shaft 2a. The pinion 4 engages teeth 17c provided on a peripheral part of the rotary ring 17 to transmit rotation to the rotary ring 17. The flexible printed circuit board 18 to which power supply lines 12a and 13a for the coils 12 and 13 and a power supply line 14a for the conductive pattern plate 14 are connected is attached by means of an adhesive or a screw to the end face of a lower left part of the support member 1 on the same side on which the rotor 2 is disposed. To the end face of a right part of the support member 1 is attached by a screw 14b the conductive pattern plate 14 which has a conductive pattern as will be described later on. The attached position of this plate 14 is adjustable by adjusting the tightening position of the screw 14 relative to the slot 1f which has the screw 14 inserted therein and extends in the circumferential direction of the support member 1. The pattern plate 14 is electrically connected to the flexible printed circuit board 18 and is connected to a control circuit via the board 18.

The cam plate 15 which is tightly connected to the support member 1 is provided with four flat-head protrudent parts 15b to 15e which are disposed in positions corresponding to those of the screw holes 1e provided in the support member 1. These protrudent parts 15b to 15e are provided with through holes 15f for inserting screws 3. Each of the holes 15f extends in the circumferential direction of the cam plate 15. Therefore, in securing the cam plate 15 to the support member 1 by inserting the screws 3 into the holes 15f and the holes 1e, the tight connected position of the cam plate 15 relative to the support member 1 is adjustable by slightly moving the cam plate 15 in the circumferential direction through the holes 15f. The protrudent parts 15b to 15e of the cam plate 15 is arranged to serve as spacers for the purpose of securing some necessary clearance between the support member 1 and the cam plate 15 and also to have their inner circumferential faces serve to carry the rotary ring 17. The outer circumferential face of the rotary ring 17 is rotatably carried by the inner circumferential faces of the protrudent parts 15b to 15e.

The rotary ring 17 is provided with five pin inserting holes 17a. A pin 16b which is provided on each of five diaphragm blades 16 (only one of them is shown in FIG. 1) is rotatably inserted in an applicable one of these holes 17a. The five diaphragm blades 16 are thus pivotally attached to the rotary ring 17. The movement of these blades 16 is controlled by cam slots 15a provided in the cam plate 15 with pins 16a which are protruding from the blades 16 slidably inserted in the cam slots 15a.

The rotary ring 17 is further provided with the teeth 17c which are arranged on a peripheral part of the ring 17 to engage the pinion 4; and a protrudent part 17b. The protrudent part 17b is provided with two rotary conductive pieces 17d and 17h which are arranged to separately come into sliding contact with the conductive pattern. The conductive pattern plate 14 and the rotary conductive pieces 17d and 17h jointly form aperture position detecting means for electrically detecting the aperture position of the diaphragm as to whether it is in a full open state or in a slightly stopped state. The details of the aperture position detecting means (particularly the arrangement of the conductive pattern plate and the above stated two-phase stepping motor) will be described later with reference to FIGS. 5 to 7.

In assembling the support member 1, the cam plate 15 and the rotary ring 17, the protrudent part 15b of the cam plate 15 is positioned in place between the protrudent part 17b and the toothed part 17c of the rotary ring 17. Therefore, when the rotary ring 17 is rotated clockwise as viewed on FIG. 1, the clockwise rotation of the rotary ring 17 is prevented from further rotating as one side face 15g of the protrudent part 15 comes to abut on one end 17f of the toothed part 17c. When the ring 17 is rotated counterclockwise, the further rotation of the ring is prevented as one end face 17e of the protrudent part 17b comes to abut on the other side face 15h of the protrudent part 15b. In other words, the protrudent part 15b of of the cam plate 15, the protrudent part 17b of the rotary ring 17 and one end 17f of the toothed part 17c are arranged as stoppers for limiting the rotation of the rotary ring 17 to a given rotatable angle range.

FIG. 2 shows in an oblique view the motor driven exposure adjusting device 19 of this invention obtained by assembling into one body the support member 1, the rotor 2, the stators 6 to 9, the coils 12 and 13, the conductive pattern plate 14, the cam plate 15, the diaphragm blades 16, the rotary ring 17, etc. The flexible printed circuit board 18 is not shown. However, the board 18 has its arcuate part mounted on one side of the support member 1 while the fore end connection terminal of its strip-shaped part is arranged to be connected to the case 20 of an electronic control device. The case 20 contains therein a control IC (integrated circuit) which is arranged to control the coils 12 and 13 and power supply to them and to exchange signals with an IC which is disposed within the camera body. The case 20 is mounted on a stationary part of the lens barrel or the like. In this embodiment, the case 20 is disposed at a stationary part within the lens barrel in such a way as to have it located in a space below the two-pase stepping motor which consists of the rotor 2, the stators 6 to 9 and the coils 12 and 13. Therefore, the space available below the two-phase stepping motor can be advantageously utilized, because: In case that the motor driven exposure adjusting device 19 is arranged in one unified body with a moving lens frame within a zoom lens barrel, the two-phase stepping motor which is protruding would cause some unused space left beneath the motor at the end of the moving stroke of the lens frame. Whereas, with the control IC, etc. of the lens barrel placed within the arcuate case 20 as shown in FIG. 2 and disposed within the above stated space, this arrangement permits effective utilization of the space.

Figure 3B:
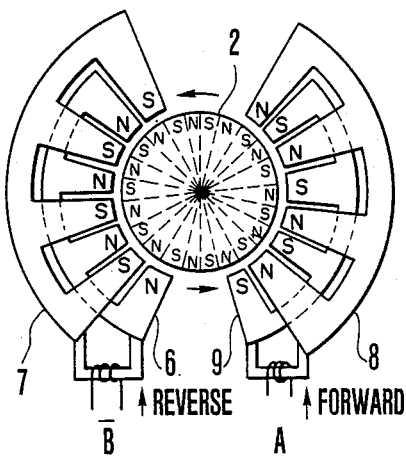
Figure 3C:
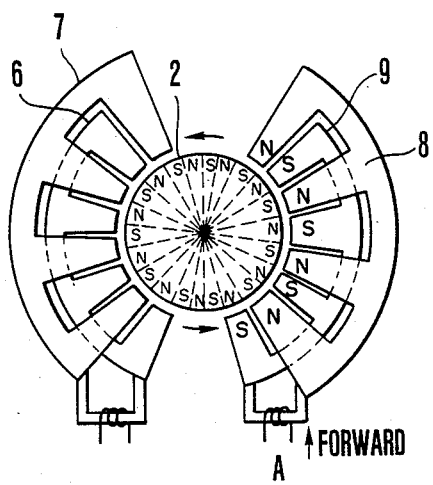
Figure 3D:
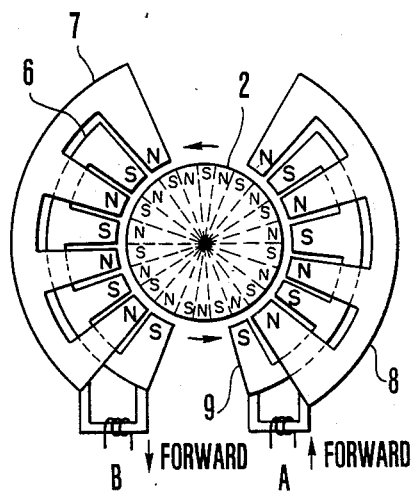
Figure 4:
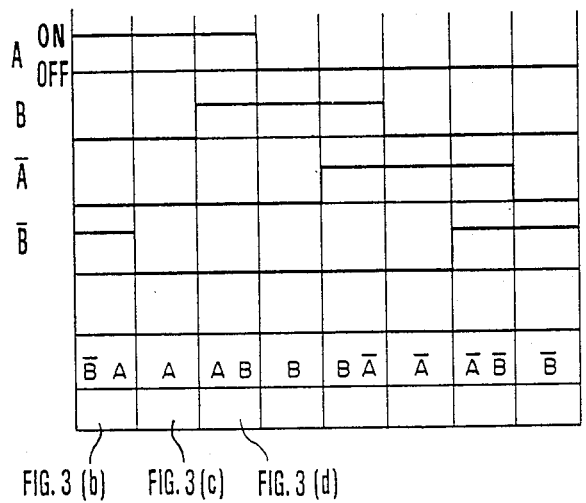

Referring to FIGS. 3(a) to 3(d) and 4, the two-phase stepping motor operates as described below:

FIGS. 3(a) to 3(d) show the relative positions between the rotor 2 and the stators 6 to 9 and an indexing action on the rotation of the rotor 2. FIG. 4 shows in a table the excited states of the stators 6 to 9 in relation to the illustrations of FIGS. 3(a) to 3(d).

Referring to FIG. 3(a) which shows the relative positions obtained between the rotor 2 and the stators 6 to 9 when the coils 12 and 13 are not energized, the S-pole pieces of the rotor 2 are normally opposed to the teeth 6a of the stator 6 under this condition. Meanwhile, the halves of the the S-pole and N-pole pieces of the rotor 2 are normally opposed to the teethes 8a and 9a of other stators 8 and 9. In this instance, an angle $\theta$ between the farthest end tooth of the stator 7 and the nearest end tooth of the stator 8 is expressed $\theta = n P + \frac{1}{4} P$, wherein P represents a pitch between adjacent teeth of the stators 6 and 7 and between adjacent teeth of the stators 8 and 9.

In turning around the rotor 2 from the halted position of FIG. 3(a) to a given degree of angle in a given direction, the length of time (or number of control pulses) and the direction of current supply to the coils 12 and 13 are controlled, for example, as shown in FIG. 4.

FIG. 4 shows the direction of current supply on the axis of abscissa and the time of current supply (or the number of control pulses) on the axis of ordinate. A reference symbol A denotes the current supply to the coil 13 in the forward direction and $\overline{A}$ the current supply to the coil 13 in the reverse direction, as also shown in FIGS. 3(b) to 3(d). A symbol B denotes the forward current supply to the coil 12 and $\overline{B}$ the reverse current supply to the coil 12. The rotation of the rotor 2 is controlled in a manner as described below with reference to FIGS. 3(b) to 3(d) and 4:

Referring to FIGS. 3(b) and 4, when the current supply A is effected to the coil 13 and the current supply $\overline{B}$ to the coil 12, the teeth 6a of the stator 6 are magnetized to the pole N; the teeth 7a of the stator 7 to S; the teeth 8a of the stator 8 to N; and the teeth 9a of the stator 9 to S respectively. As a result, the teeth of the stators 6 to 9 are attracted by or repelled off the magnetic pole pieces arranged on the outer circumferential surface of the rotor 2 to cause the rotor 2 to turn around as much as $\frac{1}{4}$ P counterclockwise. At that instant, a force of the stators 6 and 7 on the rotor 2 and a force of the stators 8 and 9 on the rotor 2 become equal to each other and in opposite directions. This brings the rotor to a stop. Then, if the current supply $\overline{B}$ is alone cut off as shown in FIG. 4, the stators 6 and 7 are demagnetized while other stators 8 and 9 remain excited as shown in FIG. 3(c). Therefore, the rotor 2 which is in repose in a position deviating as much as $\frac{1}{4}$ P from the teeth of the stator 6 and 7 turns round counterclockwise until it comes to a stop once again in a position to have its N-pole pieces normally opposed to the teeth 9a of the stator 9 which are magnetized to the pole S. The rotation angle of the rotor 2 in the latter case is also $\frac{1}{4}$ P.

When the current supplies B and A are effected respectively to the coils 12 and 13, the teeth 6a of the stator 6 is excited to the magnetic pole S; the teeth 7a of the stator 7 to N; the teeth 8a of the stator 8 to N; and the teeth 9a of the stator 9 to S respectively. Then, according to the same principle mentioned above, the rotor 2 turns around counterclockwise as much as $\frac{1}{4}$ P and comes to a stop. The combination of the directions of the current supply to the coils 12 and 13 are not limited to the combinations mentioned above. Besides the above stated combinations, there are five other combinations including B, B and $\overline{A}$, $\overline{A}$, $\overline{A}$ and $\overline{B}$ and $\overline{B}$ and, in all, there are eight different combinations. In the case of this embodiment, the rotor 2 is caused to rotate stepwise by controlling the current supply to the coils 12 and 13 with one round of the above state process of effecting the power supply represented by one pulse.

Figure 5:
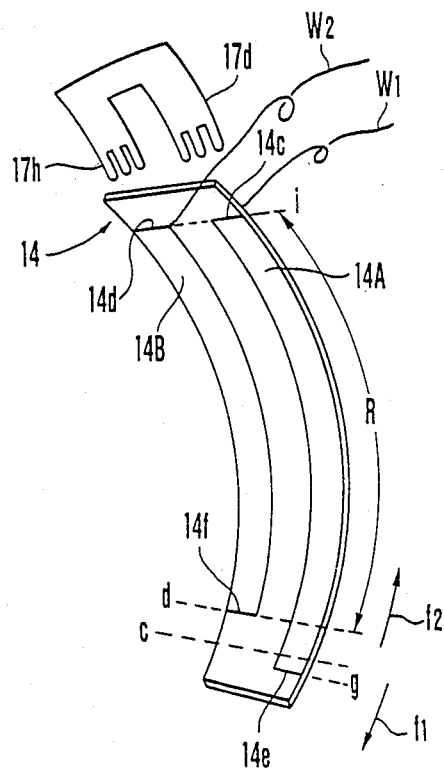
FIG. 5 is an enlarged oblique view showing an electric conductive pattern plate and a rotary conductive piece included an aperture position detecting means provided on the motor driven exposure adjusting device arranged as the first embodiment.
Figure 6:
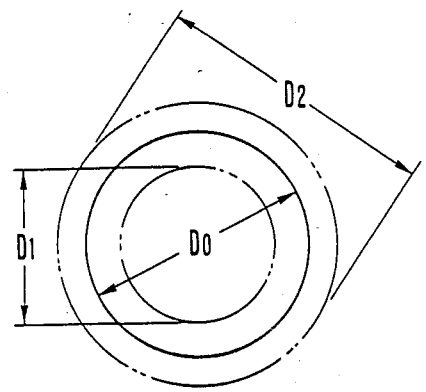
FIG. 6 shows a relation between an optical path hole and an aperture to be formed by diaphragm blades (light shielding blades).
Figure 7:
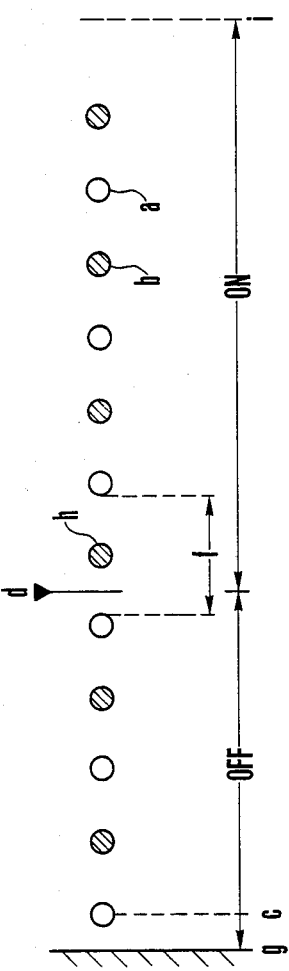
FIG. 7 shows a relation between the rotation, of a rotary ring 17 and step positions.

Referring to FIGS. 5 to 7, the aperture state detecting means which consists of the above stated rotary conductive pieces and the conductive pattern plate 14 is arranged in the following manner: This aperture state detecting means is a rotary sliding type detecting switch which consists of the above stated rotary conductive pieces and conductive patterns. The two rotary conductive pieces 17d and 17h are arranged side by side on equal radial points of the rotary ring 17 to separately come into sliding contact with two conductive patterns 14A and 14B respectively.

The two conductive patterns 14A and 14B are formed on the conductive pattern plate 14 and arcuately extend along the rotating loci of the rotary conductive pieces 17d and 17h in a strip-like shape. These patterns are connected via signal transmission lines W1 and W2 to a signal processing circuit which is not shown and are further connected to a control circuit via the signal processing circuit. The lengths of the conductive patterns 14A and 14B (which are fixed conductive pieces) differ from each other. Their first end parts 14c and 14d are located in the same position i on the arc of the conductive pattern plate 14, i.e. in the same rotation angle positions of the rotary conductive pieces 17d and 17h. When the rotary ring 17 turns around, the first end parts 14c and 14d concurrently come into contact with the rotary conductive pieces 17d and 17h or concurrently part from these pieces. Meanwhile, since the second end part 14e of the conductive pattern 14A and the second end part 14f of the conductive pattern 14B are located in different positions, the contacting time of the rotary conductive piece 17d with the conductive pattern 14A and that of the other piece 17h with the other pattern 14B differ from each other. The end part 14f of the conductive pattern 14B is located in a position d which corresponds to a state in which the optical path hole 17g of the rotary ring 17 is fully opened, i.e. a state in which the aperture defined by the diaphragm blades 16 coincides with the optical path hole 17g. Meanwhile the position g of the second end part 14e of the conductive pattern 14A is a point where the rotation of the rotary ring 17 in the direction of arrow f1 is arranged to be blocked by a stopper which is not shown. When the rotary conductive piece 17d reaches the end part 14e during its rotation in the direction of arrow f1, the rotary ring 17 is stopped from rotating further by means of this stopper.

At a point c which is between the positions d and g, the aperture defined by the diaphram blades 16 is somewhat larger than the optical path hole 17g. This point corresponds to a state of the camera in which the camera is kept waiting for a photographing operation. At this point c, the two-phase stepping motor is stably kept in a halted state.

When the rotary conductive pieces 17*d* and 17*h* are located within a range R from the position i of the first end parts 14*c* and 14*d* of the conductive patterns 14A and 14B to the position d of the second end part 14*f* of the conductive pattern 14B, the switch is in an ON state. Then, the aperture defined by the diaphragm blades 16 has a smaller diameter than the diameter of the optical path hole 17*g* (i.e. a maximum aperture).

FIG. 6 shows the diameter D0 of the optical path hole 17*g* of the rotary ring 17 (i.e. the maximum aperture) in relation to the diameters D1 and D2 of the apertures differently defined by the diaphragm blades 16. The aperture of the diameter D2 is formed by the diaphragm blades 16 when the rotary conductive piece 17*d* is halted at the point c on the conductive pattern 14A. The aperture of the diameter D1 is formed by the diaphragm blades 16 when the rotary conductive pieces 17*d* and 17*h* are within the above stated range R. The point or position c of the rotary conductive pieces 17*d* and 17*h* at which the aperture formed by the diaphragm blades comes to have the diameter D2 represents either a state of the camera waiting for a photographing operation or a non-photographing state of the camera. In photographing, the rotary conductive pieces 17*d* and 17*h* moved from the point c into the range R in the direction of arrow f2.

FIG. 7 shows the rotation locus, i.e. the circumferential moving locus, of the rotary ring 17 by linearly developing it. Each position a indicated by a white circle mark represents a stable position at which the ring 17 can be brought to a stop without supplying any current to the two-phase stepping motor (i.e. a mono-phase power supply position). Each point b indicated by a black circle mark represents a position at which the ring can be brought to a stop by supplying currents simultaneously to the two coils of the two-phase stepping motor.

In the case of this embodiment, the detecting switch produce an output at the position d. However, since the position d is set between two stable positions of the two-phase stepping motor, the switch operable range f is set between the stabilizing position of the rotary ring 17 and another stabilizing position at a slightly stopped down point of aperture (i.e. with the detecting switch in an ON state). Therefore, in the case of the detecting switch of this embodiment, the position of the detecting switch is changed from one position over to another before the two-phase stepping motor comes to a stable stop with the diaphragm blades 16 moved to an aperture position smaller than the diameter D0 of the optical path hole 17*g* of the rotary ring 17. This arrangement permits detection as to whether the aperture is in a full open maximum state or not while the optical path hole is open wider than the above stated diameter D0 if the detecting switch position changes before stabilizing of the position.

In a practical arrangement for adjustment, another position h may be created by effecting two-phase current supply and a switching position may be set at a point of electrical stabilization of the current supply.

Further, in this case, the positions a and b are spaced at a distance equivalent to ½ step.

Figure 8:
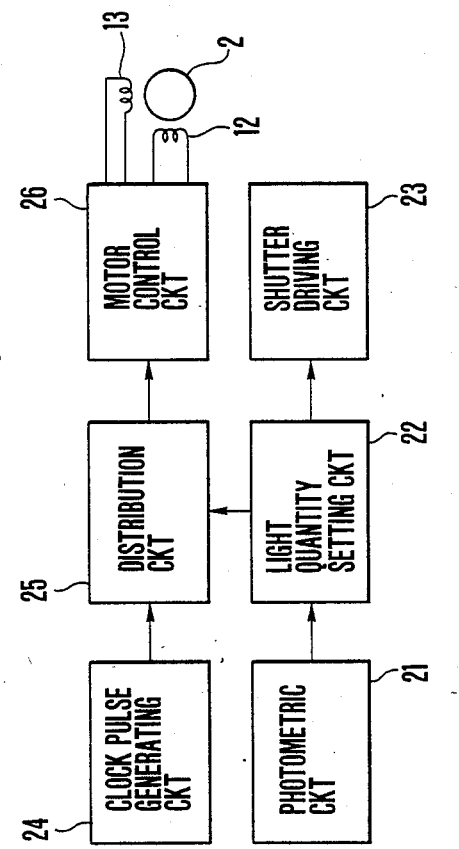
FIG. 8 is a block diagram showing a control circuit which is included in a camera incorporating the first embodiment.

FIG. 8 shows a part of a control circuit block diagram of an automatic exposure control (AE) type camera wherein the automatic exposure adjusting device arranged as shown in FIGS. 1 and 2 is arranged within a lens barrel, which is mounted on a camera body.

Referring to FIG. 8, the illustration includes a photometric circuit 21; a light quantity setting circuit 22, a shutter driving circuit 23, a clock pulse generating circuit 24, a distribution circuit 25 and a motor control circuit 26. The control operation of the camera to be performed in photographing and the operation of the diaphragm blades 16 thereof are as described below with reference to FIGS. 1 to 8:

In photographing, when a shutter release button of the camera is pushed, a light measuring action is automatically accomplished by the photometric circuit 21. The light quantity setting circuit 22 then computes and determines a necessary number of aperture stopping-down steps from a film sensitivity value and a necessary shutter speed or aperture values on the basis of a measured light value obtained as a result of the light measuring action. In the case of this embodiment, the shape of the cam slots 15*a* and the rotation angle of the rotary ring 17 are set in such a manner that the diaphragm aperture varies by ⅛ step when the rotator 2 turns around one step. In other words, the relation between the cam slot 15*a* and the rotary ring 17 is arranged to be such that the aperture changes by one step when the rotator 2 turns around eight steps.

With a number of aperture stopping down steps thus determined by the light quantity setting circuit 22, information on this is supplied to the distribution circuit 25. The circuit 25 then divides clock pulses as applicable and allows them to be supplied to the motor control circuit 26. In response to this input signal, the motor control circuit 26 controls the direction of a current to be supplied to the coil 12 or 13 and determines which of these coils is to be energized. As a result, the rotor 2 is rotated to the given degree of angle and in the given direction. The control over the rotation of the rotor 2 has already been described in the foregoing and therefore requires no further description.

With the rotor 2 thus rotated, the ring 17 is rotated via the pinion 4. The diaphragm blades 16 which are pivotally attached to the ring 17 turn around together with the ring 17 on the axis of the latter. Then while turning round, each of the blades 16 swings on its pin 16*b* along the cam slot 15*a*. With the diaphragm blades 16 turned round clockwise on the pins 16*b* as shown in FIG. 1, the diaphragm aperture is open. The aperture fully opens when the pins 16*a* reach the outermost ends of the cam slots 15*a*. With the aperture fully opened, the rotary conductive piece 17*h* carried by the rotary ring 17 no longer contacts the conductive pattern 14B provided on the conductive pattern plate 14. As a result of this, the control circuit which is not shown electrically detects that the aperture position has reached its full open state.

The features of the motor driven exposure adjusting device arranged as described in the foregoing as the first embodiment of this invention are as follows:

(i) The rotor 2 which is arranged to rotate the rotary ring 17 is in a cylindrical shape with a small diameter. Therefore, the value $GD^2$ of the rotor 2 is small to enable the rotor 2 readily started and stopped.

(ii) Unlike the exciting which is coil which is used for the electro-magnetic driving means of the known lens shutter deivce, the coil used for exciting the stators can be densely wound. These coils, therefore, give increased magnetic flux density; prevent magnetic saturation; give a larger rotor starting torque; and enable the rotor to be readily started with excellent responsivity to a high speed control operation.

(iii) The rotary ring 17 is arranged to serve also as a large reduction gear. The ring 17 is, therefore, capable of converting the high speed rotation of the rotor 2 into a low speed rotation having a large torque. This enables the embodiment to be usable as a diaphragm device of a sufficiently large aperture for a single-lens reflex camera.

(iv) The aperture position detecting means is arranged to be suited for control over a two-phase stepping motor. Therefore, the open state of the aperture can be accurately detected.

The arrangement of the embodiment described, therefore, permits reduction both in size and weight of a singl-lens reflex camera and its interchangeable lens. Besides, the diaphragm device of the embodiment permits adoption of a direct electrical driving method.

Figure 9:
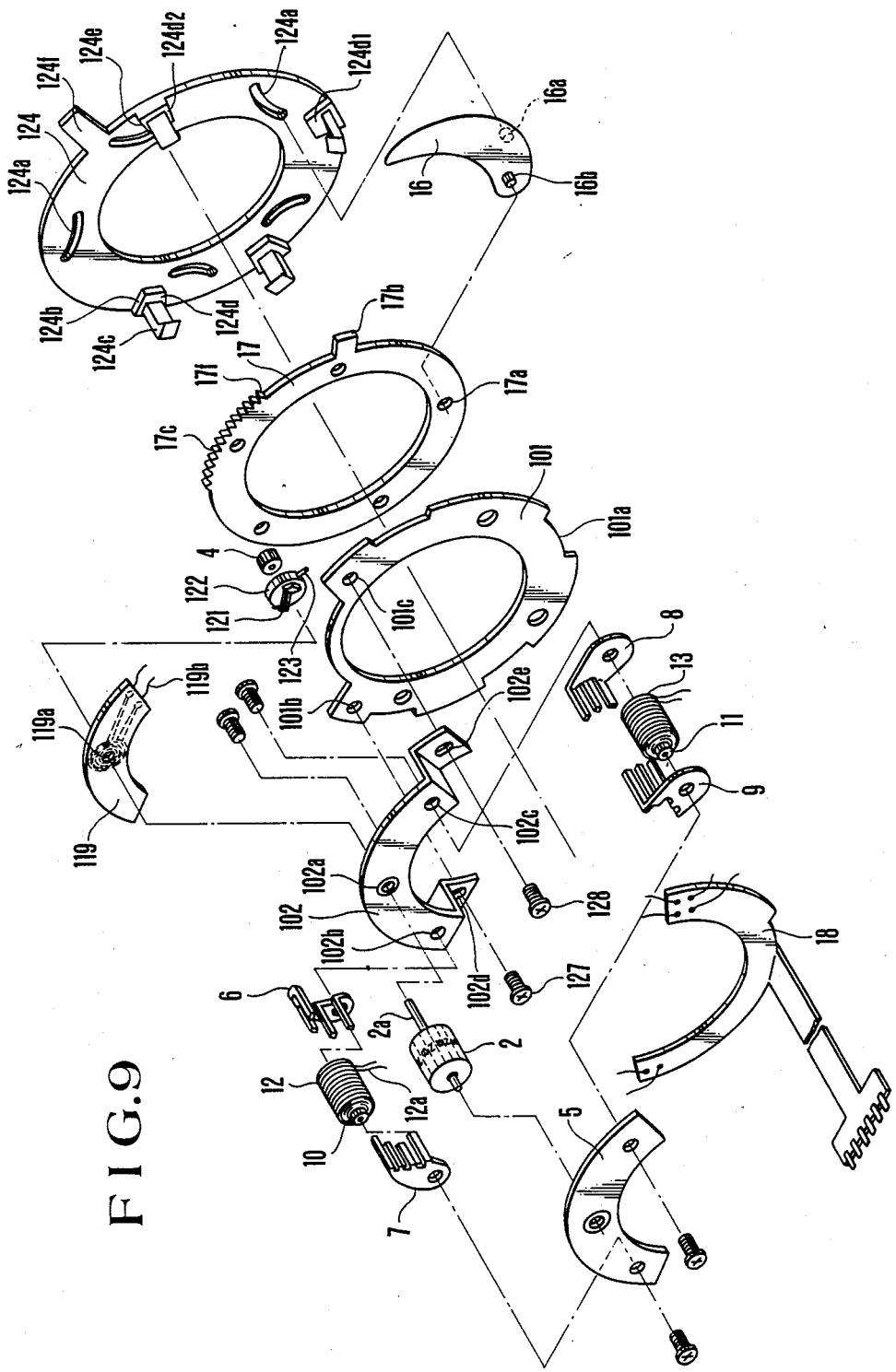
FIG. 9 is an exploded oblique view showing an electro-magnetically driven diaphragm unit arranged according to this invention as a second embodiment thereof.
Figure 10:
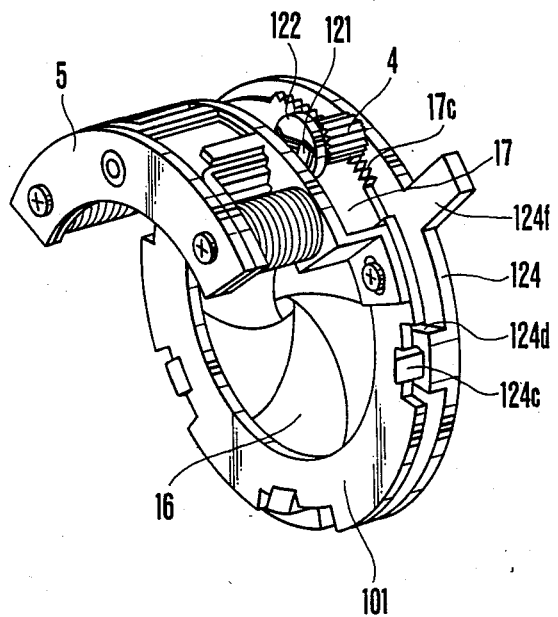
FIG. 10 is an assembly view showing the diaphragm unit arranged as the second embodiment.

A second embodiment of this invention is next described below with reference to FIGS. 9 to 12, wherein the same component parts as those of the first embodiment are indicated by the same reference numerals and the details of them are omitted from description:

Referring to FIG. 9, an annular base plate 101 is provided with a middle aperture which provides a passage for photographing light. A motor part mount plate 102 is mode of an insulating material and is provided with a bearing 102a. A printed circuit board 119 which is provided with a conductive pattern 119a is secured to the motor part mount plate 102. Lead wires 119b of the conductive pattern 119a are soldered to the nodes of a flexible printed circuit board 18 which is attached to the above stated annular base plate 101. Meanwhile, the connection lines 12a and 13a of the above stated coils 12 and 13 are soldered to other nodes of the flexible printed circuit board 18.

A brush 121 is arranged to slide over the conductive pattern 119a of the printed circuit board 119. The brush 121 is secured to a rotary cylinder 122 which is loosely fitted on the rotor shaft 2a which is described in the foregoing. The inner diameter of the rotary cylinder 122 is arranged to be in such a relation to the diameter of the rotor shaft 2a that it permits the latter to be loosely fitted therein. The rotary ring 122 is made of an insulating material. When the ring 122 is tightly connected to the rotor shaft 2a by tightening an adjustment screw 123, the rotor shaft 2a and the rotary ring 122 are rotatable together. Therefore, the position of the brush 121 is adjustable as necessary. In other words, after completion of assembly work of the diaphragm device, the switching point of the switch which is provided for detecting whether the diaphragm is fully open can be adjusted by adjusting the connecting position between the rotor shaft 2a and the rotary ring 122 by loosening the adjustment screw 123 from outside.

The arrangement of the diaphragm device is as follows: An annular cam plate 124 is provided with a plurality of known diaphragm cams 124a. Each of the diaphragm blades 16 is provided with a dowel 16a. These dowels are inserted in the cams 124a. Another dowel 16b is provided on the reverse side of each of the blades 16. The reverse side dowels 16b are inserted in a plurality of holes 17a provided in the rotary ring 17 which is arranged to turn around on the optical axis. The outer circumferential face of the rotary rind 17 engages the inner faces 124b of separating projections 124d which are disposed at four parts of the above stated cam plate 124. The ring 17 is thus rotatably carried by the cam plate 124. A rack 17c is formed on the peripheral edge of the rotary ring 17 in an arcuate shape which is concentrical with the ring 17. The rack 17c is arranged to engage the pinion gear 4 which is mentioned in the foregoing. The above stated separating projections 124d are provided with hooked parts 124c which are four in number. The annular base plate 101, the cam plate 124, the diaphragm blades 16 and the rotary ring 17 are unified by engaging the four hooked parts 124c with four notches 101a which are provided in the outer circumference of the base plate 101. The cam plate 124 is thus carried by the base plate 101 in such a way as to be turnable on the optical axis relative to the latter between the notches 101a. The cam plate 124 can be turned around there by a turning operation on the zoom ring provided on a lens barrel which is not shown. In short, the diaphragm aperture is thus arranged to be changed by a zooming operation. The rotary ring 17 has a projection 17b which is arranged to restrict the rotation of the ring 17 in conjunction with the projection 124d1 which is one of the projections of the cam plate 124. The rotation of the ring 17 in the reverse direction is restricted jointly by a rack end face 17f provided on the peripheral edge of the ring 17 and the side face 124e of another projection 124d2 of the cam plate 124. Screws 127 and 128 are used for securing the motor part mount plate 102 to the annular base plate 101 via slots 102d and 102e.

The motor part is arranged to have its rotating position adjustable along the optical axis relative to the diaphragm part by virtue of the slots 102d and 102e provided in the motor part mount plate 102. The position of the motor part (or the position of a rotor magnet 2) thus can be determined by this adjustment relative to the datum position of the diaphragm aperture. The printed circuit board 119 and the brush 121 jointly form a switch which is arranged to turn off when the aperture is in a full open state and to turn on when it is slightly stopped down. Since the camera is designed to make light measurement at a maximum aperture and requires a discrimination as to whether the diaphragm is in a full open state, this switch is provided for making that discrimination. For example, should the diaphragm aperture happen to be stopped down even to a slight degree by an accidental move of the diaphragm blades 16 as a result of some external impact, no light measuring action is permitted until the diaphragm blades are moved back to give the maximum aperture.

FIG. 12 shows the halting positions of the rotor magnet 2 of a mono-and two-phase driving stepping motor in relation to the diaphragm aperture. The illustration is given on the assumption that a maximum aperture diameter is arranged to be determined by the diaphragm blades 16. Each of circle marks (a) indicates a monophase energizing position where the rotor magnet 2 can be brought to a stop without supplying a current thereto. Each of hatched circle marks (b) indicates a position where the rotor magnet 2 can be brought to a stop by simultaneously energizing two coils. A circle mark (c) indicates a position where the diaphragm is kept waiting in its maximum aperture state and where the maximum aperture diameter is determined. A mark (d) indicates a position where the connecting position of the aperture position detecting switch which is composed of the conductive pattern 119a and the brush 121 changes from one position over to another. A mark (e) indicates a range within which the switch position can be changed. A mark (f) indicates a mechanical stopper position, which stops the stepping motor from further rotating. In the case of this specific embodiment, the distance between the positions (a) and (b) is arranged to be equivalent to ⅛ step of the aperture. The purpose of the aperture open state detecting switch may be attained by making a discrimination as to whether the diaphragm is in its maximum aperture position or the diaphragm blades have moved in the direction of stopping down the aperture. However, since a signal indicative of the result of the discrimination is generally arranged to be formed by means of a mechanical arrangement such as a method of using some electrical contact or a method of shifting a brush position on a pattern, it is difficult to adjust the switch position to the position (c) at which the diaphragm is at its maximum aperture. To solve this problem, there is provided the adjustable range (e) for the above stated switch operating position for facilitating the above stated adjustment. This range (e) is arranged in such a way as to have the switch operate between a position of a smaller aperture than the maximum aperture position (f) and an aperture position (a) which is located first in the direction of a minimum aperture after another maximum aperture position (c). In other words, it is possible to find out whether the diaphragm is at its maximum aperture with the switch arranged to operate before the blades are moved from the maximum aperture position (c) toward a smaller aperture and comes to a stop in a stabilized state under a non-energized condition. With the above stated switching range arranged to be not exceeding ¼ step in accordance with this method, a high degree of reliability of the electro-magnetically driven diaphragm can be assured. In actual adjustment, a position (g) is created by two-phase energizing the motor and the switching position is set at a point where electrical stabilization is obtained.

It is a feature of the above stated maximum aperture detecting switch arrangement of the second embodiment that the opening state of the diaphragm blades is directly detected through the position of the shaft 2a of the rotor magnet 2. The aperture position thus can be accurately detected by correlating the switch operation with the driving steps of the rotor magnet 2. Further, in the case of the second embodiment, the coupling position between the shaft 2a of the rotor magnet 2 and the rotary ring 122 which forms the switch device is adjustable. Therefore, adjustment can be accomplished without being affected by the back-lash of a transmission gear (the pinion gear 4 and the rack 17c), a play between the pin 16a or 16b of each of the diaphragm blades 16 and the inserting hole 17a and a play of the diaphragm cams 124a. With the coupling position between the shaft 2a of the rotor magnet 2 which remains stable either in a non-energized state or in an energized state and the rotary ring 122 which forms the switch device adjusted in the manner as described above, the motor position can be adjusted without being affected by back-lash, etc. Besides, the correlation to the rotating step of the rotor magnet 2 is also adjustable. Therefore, the above stated adjustment can be very effectively carried out.

Figure 13:
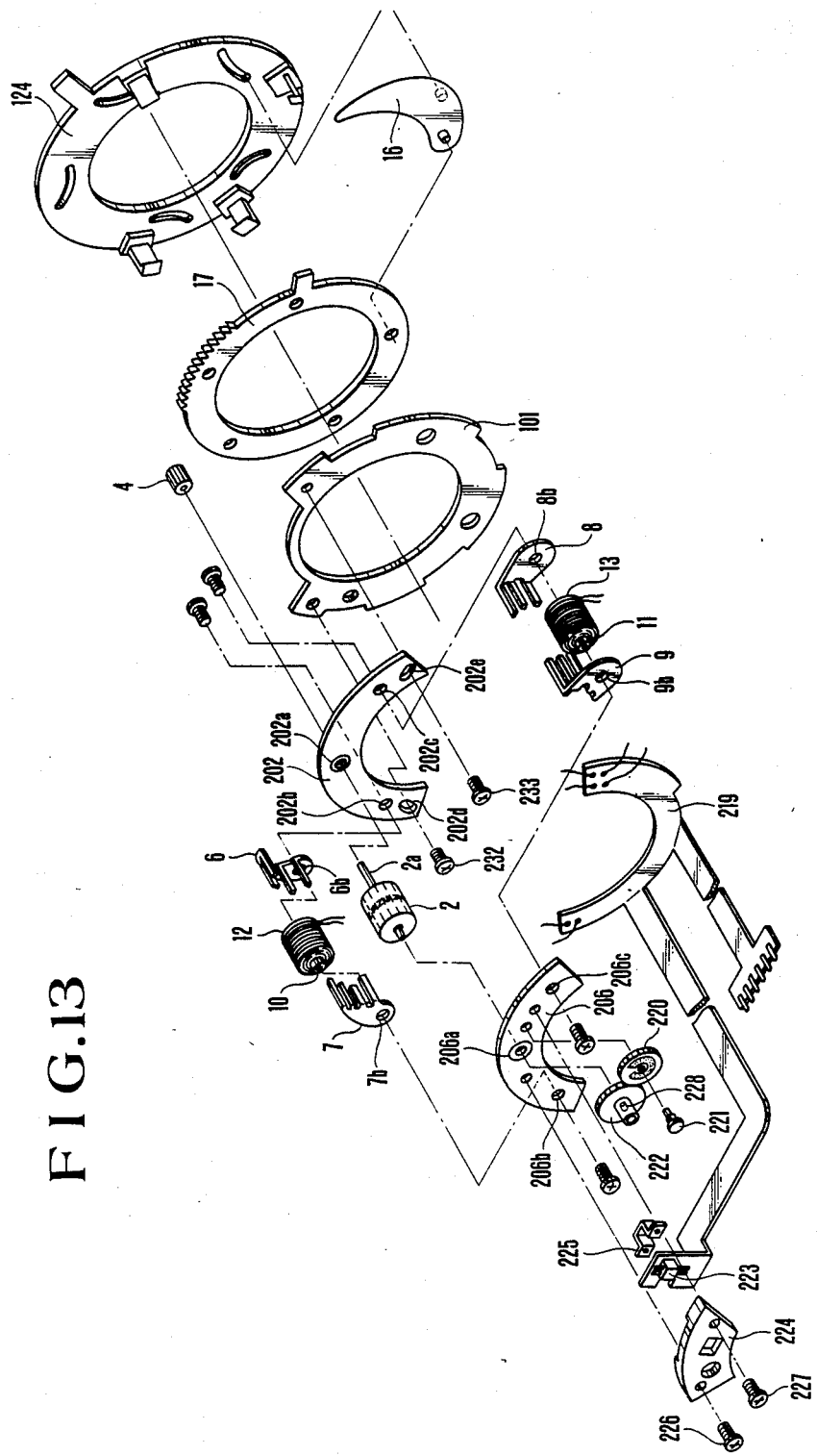
FIG. 13 is an exploded oblique view showing an electro-magnetically driven diaphragm unit arranged as a third embodiment of this invention.
Figure 14A:
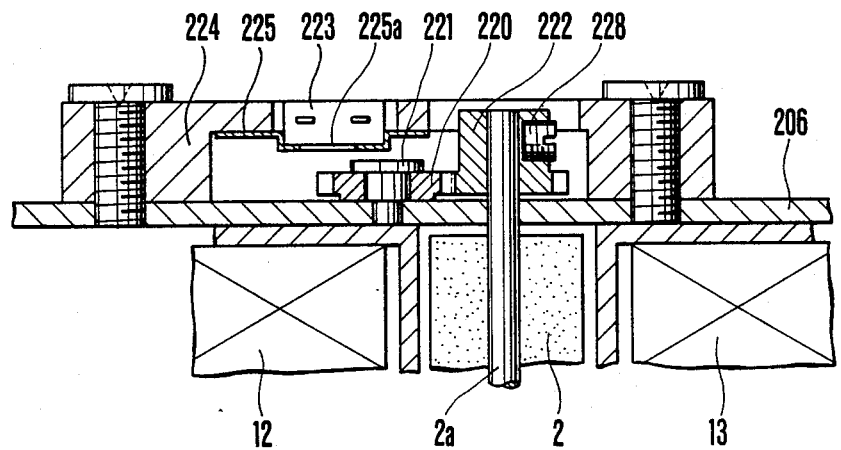
FIG. 14(a) is a sectional view showing the essential parts of the unit of FIG. 13 in an assembled state.
Figure 14B:
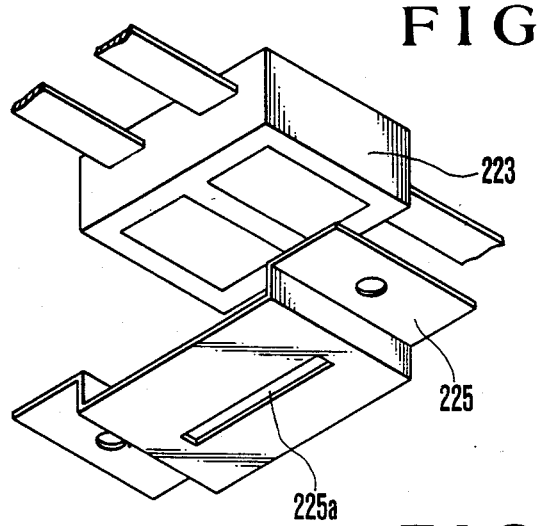
FIG. 14(b) is an enlarged oblique view showing a part of a full-open or maximum aperture detecting switch included in FIG. 13.
Figure 15:
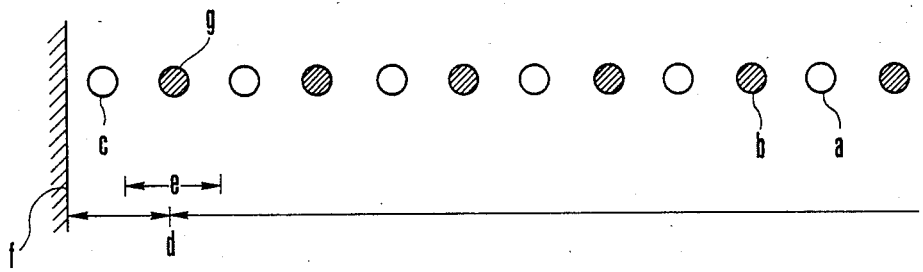
FIG. 15 the halting positions of the electro-magnetic driving motor of the third embodiment.
Figure 16:
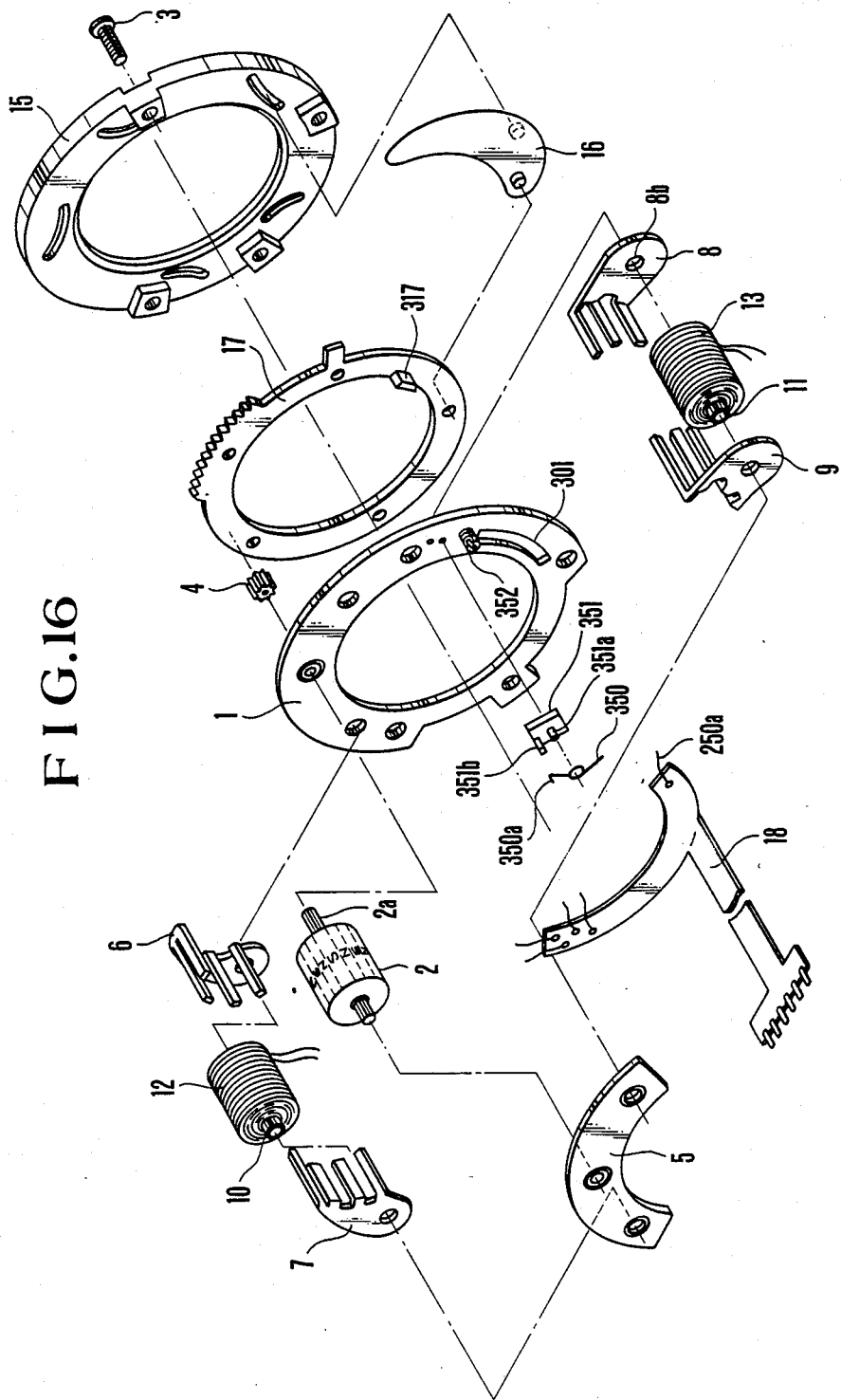
FIG. 16 is an exploded oblique view showing an electro-magnetically driven diaphragm unit arranged as a fourth embodiment of this invention.
Figure 17:
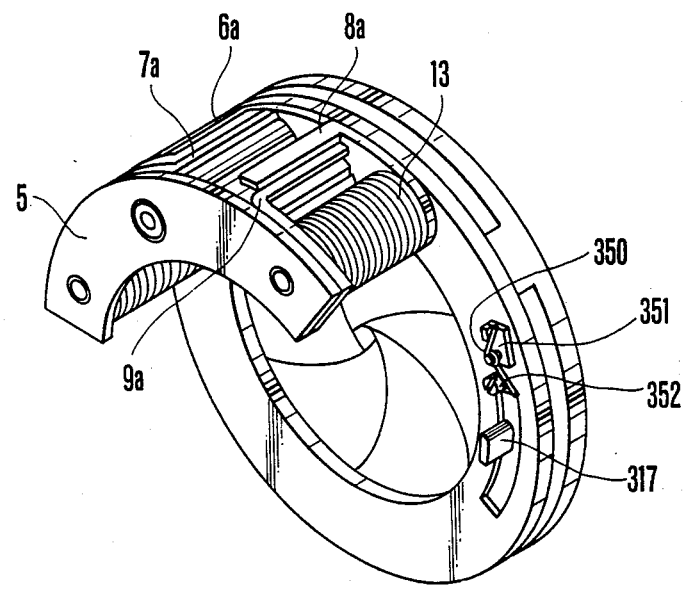
FIG. 17 is an oblique view showing the same diaphragm unit in an assembled state.

Referring to FIGS. 13 to 15, a third embodiment of this invention is described as follows: In these drawings, components parts arranged in the same manner as those of the first and second embodiments are indicated by the same reference numerals and the details of them are omitted from description. A motor part mount plate 202 is provided with a bearing 202a. The rotor magnet 2 is secured to the rotor shaft 2a, which is carried by the above stated bearing 202a. The pinion gear 4 is attached to the fore end of the rotor shaft 2a. Another end of the rotor shaft 2a is carried by a bearing 206a provided in an arcuate base plate 206 which is made of a metal material of small thermal expansion and contraction (phosphor bronze, for example). These bearings thus rotatably carry the rotor magnet 2. The rotor magnet 2 is made of, for example, a plastic molded magnet with its outer circumference divided into a plurality of N and S pole pieces which are differently magnetized and have the N and S poles alternately arranged.

An iron core 10 is provided with screw holes in both end parts thereof. One end of the iron core 10 is secured with a screw to the above stated motor part mount plate 202 via the hole 202b of the latter. The other end of the iron core 10 is secured with a screw to the arcuate base plate 206 via the hole 206b of the latter. Another iron core 11 is likewise secured with screws to stators 8 and 9 via their holes 8b and 9b. A flexible printed circuit board 219 is cemented to the annular base plate 101. The lead wires 12a and 13a of coils 12 and 13 are soldered to the nodes of the flexible printed circuit board 219. A pulse generating gear 220 is rotatably fitted on a shaft 221 which is secured to the arcuate base plate 206. The gear 220 is made of a highly bright material (or a material surface treated to have a high degree of brightness) such as bright aluminum. On the circumferential surface of the pulse generating gear 220 is printed a black pattern which is arranged to give a non-reflecting surface. A part of the black pattern is cut away to show the high brightness aluminum surface. This part serves as a reflecting face. An adjustment gear 222 is rotatably fitted on the above stated rotor shaft 2a and is arranged to engage the pulse generating gear 220. Like the pulse generating gear 220, this adjustment gear 222 is made of a material of small thermal expansion and contraction, such as a steel material. A photo reflector 223 is soldered to the flexible printed circuit board 219 and is opposed to the patterned surface of the pulse generating gear 220. The reflector 223 is interposed in between a housing case 224 and a reflector mask 225. With the reflector mask 225 welded to the case 224, these parts are unified into one body. As shown in FIG. 14(b), the reflector mask 225 is provided with an opening or slot 225a to enable the photo reflector to project and receive light. The photo reflector 223 is provided with light projecting and light receiving windows which are disposed above the slot 225a of the reflector mask 225.

The case 224 is attached by screws 226 and 227 to the arcuate base plate 206. An adjustment screw 228 is arranged to enable the above stated adjustment gear 222 to be rotatable together with the rotor shaft 2a. More specifically, the rotator shaft 2a and the adjustment gear 222 become rotatable together when the adjustment screw 228 is tightened, so that the rotating position of the pulse generating gear 220 (relative positions of the cut-away part of the black pattern showing the high brightness aluminum surface and the light-producting and-receiving windows of the reflector 223) can be adjusted as necessary by means of the adjustment gear 222. This adjustment is performed to adjust a point at which the detection is to be made to find whether the diaphragm is in its maximum aperture position. In other words, when the reflector 223 confronts the black pattern, the output level of the reflector 223 becomes low to allow a maximum aperture detecting switch circuit which is not shown to detect that the diaphragm is in a smaller aperture position. When the reflector confronts the high brightness aluminum surface, the output level of the reflector 223 becomes high to allow the detecting switch circuit to detect that the diaphragm is in its maximum aperture position. The adjusting arrangement described above enables the coupling position between the rotor shaft 2a and the adjustment gear 222 to be adjusted by loosening the adjustment screw from outside as necessary after the diaphragm device is completely assembled.

The motor part and the diaphragm part are coupled to each other by connecting the motor part mount plate 202 with screws to the above stated annular base plate 101. The motor part mount plate 202 is provided with two slots 202d and 202e. The plate 202 is screwed to the base plate 101 by means of screws 232 and 233 through the slots 202d and 202e. These slots permit the position of the motor part to be adjusted relative to the diaphragm part by turning the former around on the optical axis. By this adjustment, the position of the motor part (or the position of the rotor magnet 2) is determined relative to the datum position of the diaphragm aperture.

As mentioned above, the photo reflector 223 and the pattern of the pulse generating gear 220 form a switch which turns off when the diaphragm is at a maximum aperture (a maximum aperture detecting switch circuit which is not shown produces an OFF signal when the reflector 223 confronts the high brightness aluminum surface of the pattern of the pulse generating gear 220). The switch turns on when the diaphragm is at a slightly stopped aperture (the above stated switch circuit produces an ON signal when the reflector 223 confronts the non-reflecting surface of the black pattern of the pulse generating gear 220). Since the camera is arranged to measure light at the maximum aperture, this switch is provided for the purpose of finding whether the diaphragm is in the maximum aperture position. For example, in case that the diaphragm blades are accidentally moved toward a smaller aperture position by some external impact or the like, no light measuring action is allowed until the diaphragm blades are moved back to the maximum aperture position. The pulse generating gear 220 engages the gear 222 which rotates together with the rotor shaft 2a. The pulse generating gear 220 is arranged to have such a gear ratio that the maximum rotation angle of the gear 220 never exceeds 360 degrees even when the aperture is stopped down to a minimum aperture position.

FIG. 15 shows the halting positions of the rotor magnet 2 of the mono- and two-phase driving stepping motor in relation to the aperture positions of the diaphragm. The illustration is given on the assumption that the embodiment is of the kind determining the diameter of the maximum aperture by means of the diaphragm blades 16. Each of circle marks (a) indicates a point where the stepping motor can be brought to a stop without supplying a current thereto (i.e. a mono-phase energizing position). Each of hatched circle marks (b) indicates a point where the motor can be brought to a stop with current supply simultaneously effected to the two coils. A circle mark (c) indicate a point where the motor is waiting for operation under a maximum aperture condition and where the maximum aperture diameter is defined by the blades. A symbol (d) denotes a point where the maximum aperture detecting switch which is formed by the reflector 223 and the pulse generating gear 220 performs a switching action. A symbol (e) denotes a range within which the switching action can be performed like at the point (d). A symbol (f) denotes a mechanical stopper position at which the stepping motor becomes unable to rotate any further. In this embodiment, a distance between the points (a) and (b) corresponds to ⅛ step of the aperture. The purpose of the maximum aperture detecting switch can be attained by detecting whether the diaphragm is at its maximum aperture position or the diaphragm blades are located at a smaller aperture position. In actuality, however, it is difficult to accurately adjust the switch position to the maximum aperture position (c). Therefore, the range (e) is provided for the purpose of facilitating adjustment of the point at which the switching action of the switch can be performed. This adjustment range (e) is provided between a point corresponding to a smaller aperture position than the maximum aperture position (c) and another point corresponding to one of the positions (a) located next to the maximum aperture position (c) in the direction of the minimum aperture. In other words, the switch is arranged to perform its switching action to permit detection of the maximum aperture before the blades settle in their halting positions, under a non-energizing condition, after they have accidentally moved away from the maximum aperture position (c) toward a smaller aperture position. With the above stated switching range arranged to be not exceeding ¼ step of aperture, a highly reliable electro-magnetically driven diaphragm can be obtained. In actual adjustment, a position (g) is created by two-phase energization and then the switching position is set at an electrically stabilizing point thereof.

It is a feature of the maximum aperture detecting switch arrangement of this embodiment that the maximum aperture of the diaphragm blades is detected from the rotor shaft 2a through a discrete gear transmission device instead of the gear transmission device interposed in between the rotor shaft 2a and the diaphragm unit.

The reason for this is as follows: The position of the motor can be adjusted without being affected by backlash or the like by attaching a switch device directly to the shaft 2a of the rotor magnet 2 which is stably carried (without any rattling) both under a non-energized condition and under an energized condition. That arrangement then would also permit adjustment to the rotating steps of the rotor magnet 2. However, in case that the aperture position of the diaphragm cannot be stopped down from the maximum aperture to the minimum aperture before the rotor shaft 2a makes more than one turn, the switch would come to perform its switching action a plurality of times during the stopping down process from the maximum aperture to the minimum aperture. In that case, it becomes impossible to have the switch device attached directly to the rotor shaft 2a like in the case of the second embodiment. In other words, in the event of a camera arranged to have the rotor shaft make more than one turn, the rotation of the rotor shaft 2a must be reduced to less than one turn by means of an additional gear transmission device.

Therefore, in the case of the third embodiment, the switch device is disposed within the additional gear transmission device. The back-lash between gears is reduced to a minimal degree by using such materials that have small thermal expansion and contraction for the gears, the base plate, etc. included in the gear transmission device. Therefore, the adverse effect of backlash can be reduced to a minimal degree.

Referring to FIGS. 16 to 18(e), a fourth embodiment of this invention is described as follows: In these drawings, the parts arranged in the same manner as these of the first embodiment are indicated by the same reference numerals and the details of them are omitted from description. A switch mount plate 351 which is made of an insulating material is welded to a base plate 1 by a known method. A spring 350 is made of a conductive material and is fitted on a pin part 351a of the switch mount plate 351. One end of the spring 350 is hooked on a projection 351b of the switch mount plate 351 while the other end is hooked on a switch pin 352 against the resilience of the spring. Further a lead wire 350a is soldered to one end of the spring 350. The lead wire 350a is soldered to a node of the flexible printed circuit board 18. The above stated switch pin 352 is an eccentric pin having an eccentric caulked part. The pin is rotatably mounted on the base plate 1 by caulking and is provided with a plurality of V-shaped grooves formed in the periphery thereof. The switch pin 352 is a conductive member being plated with gold. The caulking renders the pin 352 always conductive with the base plate 1. The base plate 1 is soldered to the grounding node of the flexible printed circuit board 18. In short, a switch is formed by the contact between the spring 350 and the switch pin 352. This switch is arranged to detect whether the diaphragm is at a maximum aperture.

Figure 18A:
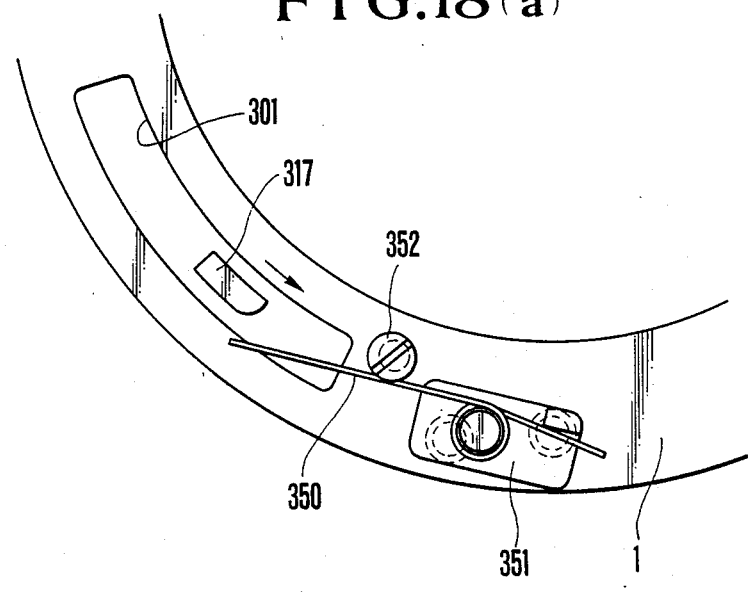
FIGS. 18(a) to 18(e) show the operation of maximum aperture detecting means of the fourth embodiment.
Figure 18B:
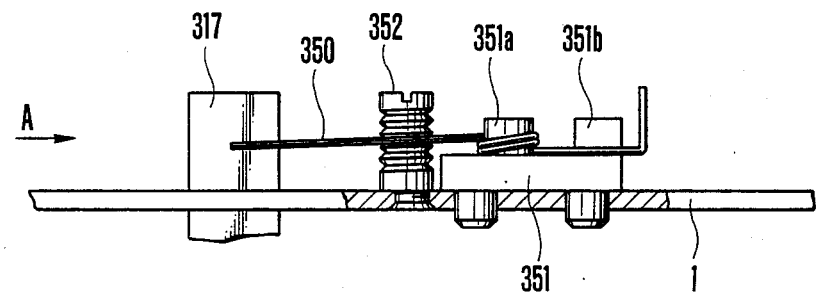
Figure 18C:
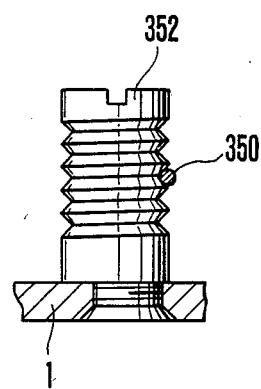

The rotary ring 17 has a projection 317, which is inserted in a slot 301 of the base plate 1. When the maximum aperture position of the diaphragm is obtained, the spring 350 and the switch pin 352 are detached from each other, that is, the switch formed by them turns off, with projection 317 coming to impinge upon one end of the spring 350. The switch which is formed by the spring 350 and the switch pin 352 is thus arranged to turn off when the diaphragm is at the maximum aperture and to turn on when the aperture of the diaphragm becomes smaller. The purpose of this switch is to be used for finding if the diaphragm is in its maximum aperture position because the camera is arranged to make light measurement at the maximum aperture. The switch inhibits the light measurement in the event of an accidental dislocation of the diaphragm blades to a smaller aperture position due to some external impact or the like. The switch enables the light measurement to be performed when the blades come back to their original positions. Further details of the operation of the maximum aperture detecting switch are as described below with reference to FIGS. 18(a) to 18(e):

FIGS. 18(a) to 18(c) show the aperture detecting switch as in a state obtained when the diaphragm is in a smaller aperture position, FIG. 18(a) showing the essential pars of it in a plan view, FIG. 18(b) showing it in a side view and FIG. 18(c) showing the essential parts of FIG. 18(b) as viewed from the direction of arrow A.

Figure 18D:
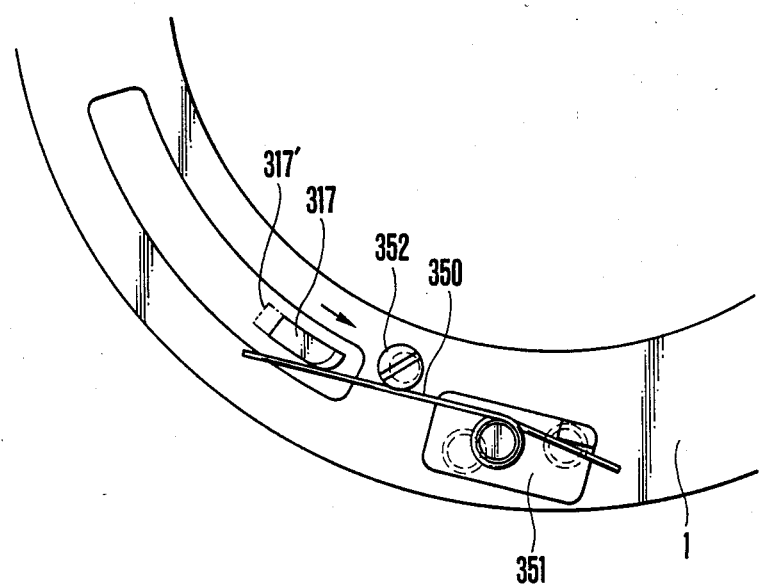

In this case, the projection 317 of the rotary ring 17 is not abutting on the spring 350. Therefore, the spring 350 remains in contact with the switch pin 352. Accordingly, the maximum aperture detecting switch is in an ON state showing that the diaphragm is in a smaller or stopped-down aperture position. When the aperture is, therefore, shifted back toward the maximum aperture, the projection 317 turns around in the direction of the arrow as shown in FIG. 18(a) until it abuts on the spring 350 as shown in FIG. 18(d) which is a plan view. FIG. 18(d) shows the projection as located in a projection position 317' which represents, as shown by a two-dot-chain line, the position of the rotor magnet obtained when the stepping motor is energized, i.e. the energized phase position thereof where the maximum aperture detecting switch changes from one position thereof over to the other.

Figure 18E:
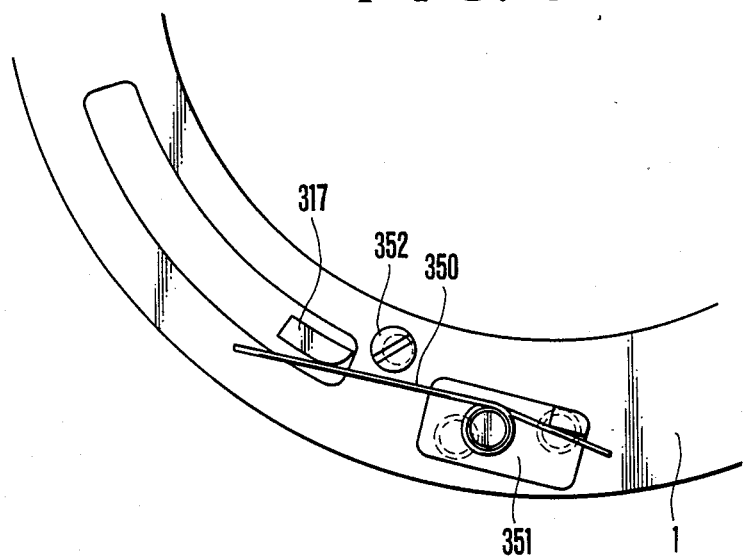

When the projection 317 is caused to turn further against the force of the spring 350, the spring 350 is detached from the switch pin 352 to turn off the maximum aperture detecting switch, which thus indicates that the diaphragm is in the maximum aperture position. FIG. 18(e) shows this in a plan view. The illustration is given on the assumption that the turning movement of the rotary ring 17 from the position shown by the two-dot-chain line in FIG. 18(d) to the position of FIG. 18(e) corresponds to one step energized movement of the rotor magnet 2 of the stepping motor. The phase of FIG. 18(e) takes place when the rotor 2 is energized. The maximum aperture detecting switch of the fourth embodiment thus performs ON-OFF switching actions as described above. The above stated processes take place in a reverse order in stopping down the aperture. As shown in an enlarged state in FIGS. 18(b) and 18(c), the switch pin 352 is provided with V-shaped grooves along its circumference for the purpose of increasing the reliability of contact between the spring 350 and the switch pin 352 by increasing the number of their contact points from one point to two points, so that inadequate contact due to intrusion of dust, etc. can be prevented.

The switching timing of the switch is adjusted by turning round the switch pin 352 which is an eccentric pin to change the timing at which the projection 317 comes to abut on the spring 350. It is a feature of the maximum aperture detecting switch of the fourth embodiment that the arrangement for detecting the maximum aperture position of the diaphragm blades is simplified with that purpose attained by simply detecting whether the switch pin 352 is in contact with the spring 350. The arrangement to turn off the switch by detaching the switch pin 352 from the spring 350 when the maximum aperture is obtained saves the stepping motor from normally being loaded with the force of the spring 350, because the rotor magnet 2 has the load only when the diaphragm is to be brought to the maximum aperture position. Therefore, the arrangement saves a loss of the driving force of the stepping motor to improve the efficiency of the stepping motor. In the case that the driving part of the stepping motor is to be disposed within a lens barrel and must be arranged in a compact size because of a limited space available within the lens barrel, the output of the stepping motor becomes very small. Therefore, the motor under such a condition would be seriously affected even by a small load. Whereas, use of the above stated maximum aperture detecting switch of the fourth embodiment for an electro-magnetically driven diaphragm device advantageously solves that problem.

Further, in the switch arrangement consisting of the spring 350 and the switch pin 352, the maximum diaphragm aperture detecting phase, as shown in FIG. 18(e), is adjusted to the energizing phase of the rotor magnet 2 of the stepping motor. This arrangement ensures highly accurate detection of the maximum aperture. If, for example, the energizing phase position of the stepping motor is adjusted to the position of the projection 317 indicated by a full line in FIG. 18(d), the contact between the spring 350 and the switch pin 352 would be disturbed by vibrations caused by the stepwise rotation of the rotor magnet 2. In that event, it is hardly possible to obtain a stable switching action. Whereas, the arrangement of the fourth embodiment of this invention solves this problem.

In the embodiment, the switch is arranged to be turned on and off by means of the rotary ring 17. However, in accordance with this invention, this arrangement of course may be changed to have the switch arranged to operate by directly receiving the rotation of the rotor shaft 2a of the stepping motor.

Figure 19:
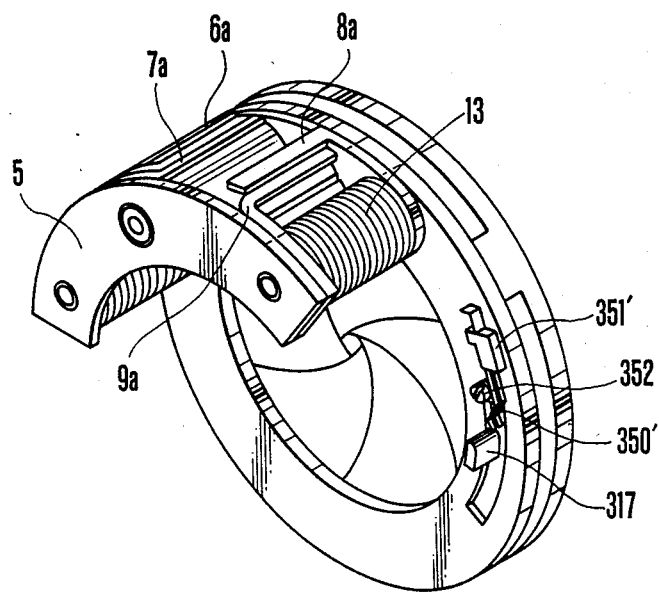
FIG. 19 is an oblique view showing an electro-magnetically driven diaphragm unit arranged as a fifth embodiment of this invention in an assembled state.
Figure 20A:
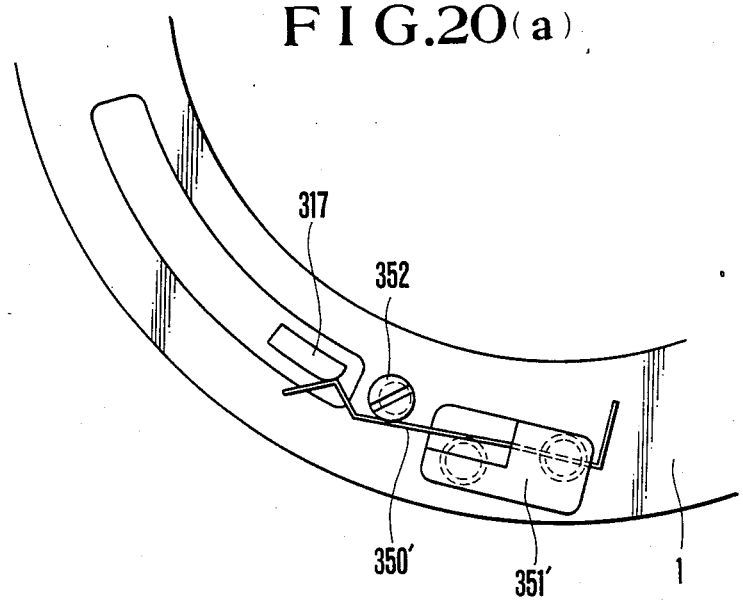
FIGS. 20(a) to 20(c) shows the operation of maximum aperture detecting means of the fifth embodiment.
Figure 20B:
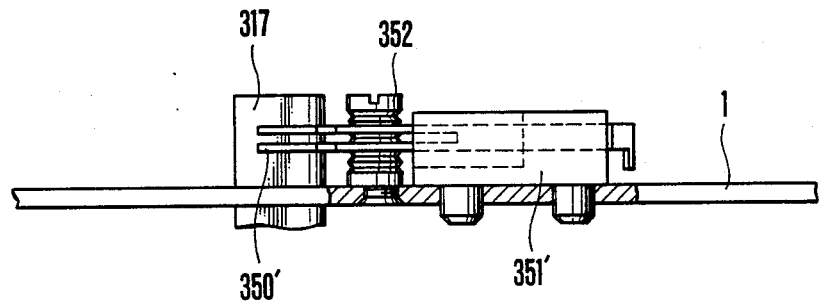
Figure 20C:
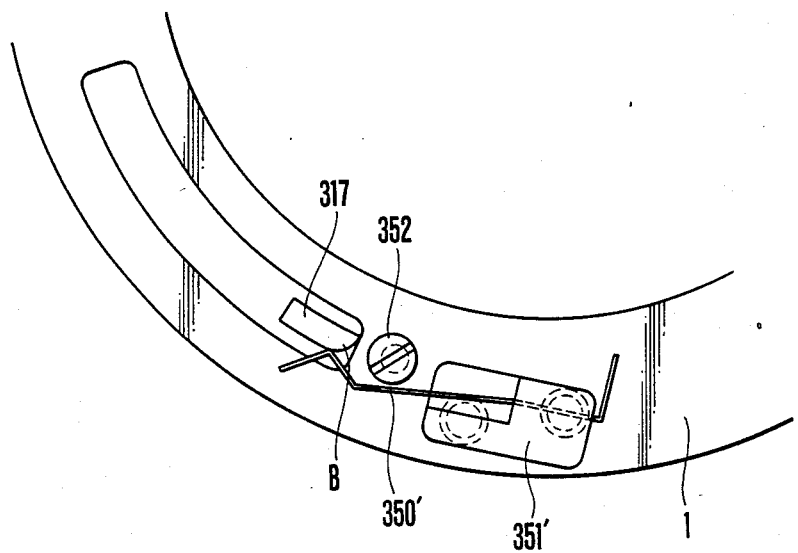

FIGS. 19 to 20(c) show a maximum aperture detecting switch which is arranged also according to this invention as a fifth embodiment thereof. The arrangement of all the parts of the fifth embodiment is the same as that of the fourth embodiment with the exception of that the spring 350 is replaced with a spring 351' and the switch mount plate 351 with a switch mount plate 351'. Therefore, the details of other parts are omitted from the following description:

The spring 350' is a contact piece having a plurality of contact parts (two contacts parts are shown) for the switch pin 352. The spring 350' is insert molded in the switch mount plate 351'. This switch arrangement is highly reliable, because. One of the contact parts will remain in contact with the switch pin even if the other is caused to be in inadequate contact by dust or the like. The maximum aperture detecting switch operates as shown in FIGS. 20(a) to 20(c) which correspond to FIGS. 18(d) and 18(e). Therefore, detailed description is omitted in the following description. Further, FIG. 20(a) is a plan view showing the essential parts of the switch. FIG. 20(b) is a side view. FIG. 20(c) is a plan view of essential parts.

When a maximum aperture position is detected as shown in FIG. 20(c), the spring 350' completely overrides the curved end face B of the projection 317 to avoid exertion of any component of force caused in the direction of rotation by the spring 350' in such a manner that the spring 350' never will be caused to come into contact with the switch pin 352 again by any impact. In other words, the spring 350' then stably keeps the projection 317 from turning round clockwise.

As described in the foregoing, the motor-driven exposure adjusting device according to this invention is capable of very accurately detecting the aperture position of a diaphragm device used, for example, for the interchangeable lens of a single-lens reflex camera.

What is claimed is:

1. A motor driven exposure adjusting device comprising:
   (a) an annular rotary member having an optical path hole provided in a central portion of said member and arranged to be opened and closed by means of a plurality of light shielding blades, the opening and closing action of said blades being controlled by the rotation of said rotary member;
   (b) a stepping motor having an axis thereof eccentrically located relative to a rotating center of said rotary member and disposed outside of the optical path hole, said stepping motor being arranged to serve as a drive source for the rotation of said rotary member;
   (c) a gear device for transmitting the output rotation of a rotor shaft of said stepping motor to said rotary member; and
   (d) aperture position detecting means for detecting whether the optical path hole is opened by said light shielding blades to a given maximum aperture position, said detecting means being formed as a detecting switch device for detecting the following states:
   (i) a stopped down aperture state wherein said detecting switch device is in a first switching condition,
   (ii) a maximum usable aperture state wherein said detecting switch is at a change-over point from a first switching condition to a second switching condition, and
   (iii) a state of an aperture greater than the optical path hole wherein said detecting switch device is in a second switching condition, said states being established as a function of the rotating angle position of said rotary member, wherein said detecting switch device of said detecting means is arranged such that the change-over point between the maximum aperture detection state and the stopped down aperture detection state is set between two stabilizing points of the stepping motor within which said stepping motor stabilizes under a non-energizing condition.

2. A device according to claim 1, wherein said rotary member has a carrying arrangement for directly carrying said light shielding blades in a swingable manner.

3. A device according to claim 2, further comprising adjusting means for adjusting the detecting position of said detecting switch device of said detecting means, said adjusting means being arranged to adjust said detecting position for detecting said change over on the basis of the rotating angle position of said rotary member.

4. A device according to claim 1, wherein the device is incorporated within an interchangeable lens.

5. A motor driven exposure adjusting device, comprising:
   (a) an annular rotary member having an optical path hole provided in a central portion of said member and arranged to be opened and closed by means of a plurality of light shielding blades, the opening and closing action of said blades being controlled by the rotation of said rotary member;
   (b) a stepping motor having an axis thereof eccentrically located relative to a rotating center of said rotary member and disposed outside of the optical path hole, said stepping motor being arranged to serve as a drive source for the rotation of said rotary member;
   (c) a deceleration gear device for transmitting the output rotation of a rotor shaft of said stepping motor to said rotary member; and
   (d) aperture position detecting means for detecting whether the optical path hole has been opened to a given maximum aperture position by said light shielding blades, said detecting means having a detecting switch device arranged to detect the following states:
   (i) a stopped down aperture state wherein said detecting switch device is in a first switching condition,
   (ii) a maximum usable aperture state wherein said detecting switch device is at a change-over point from a first switching condition to a second switching condition, and
   (iii) a state of an aperture greater than the optical path hole wherein said detecting switch device is in the second switching condition, said states being established as a function of the rotating angle position of said rotor shaft of said stepping motor.

6. A device according to claim 5, wherein said detecting switch device of said detecting means is arranged such that the change-over between the maximum aperture detecting state and the stopped down aperture detection state is set between two stabilizing points of the stepping motor within which said stepping motor stabilizes under non-energizing condition.

7. A device according to claim 6, further comprising adjusting means for adjusting the detecting position of said detecting switch device of said detecting means, said adjusting means being arranged to adjust a position of said detecting switch device for detecting the change over point on the basis of the rotating angle position of said rotary shaft.

8. A device according to claim 5, wherein the device is incorporated within an interchangeable lens.

9. A motor driven exposure adjusting device, comprising:
 (a) an annular rotary member having an optical path hole provided in a central portion of said member and arranged to be opened and closed by means of a plurality of light shielding blades, the opening and closing action of said blades being controlled by the rotation of said rotary member;
 (b) a stepping motor having a n axis thereof eccentrically located relative to a rotating center of said rotary member and disposed outside of the optical path hole, said stepping motor being arranged to serve as a drive source for the rotation of said rotary member;
 (c) a deceleration gear device for transmitting the output rotation of a rotor shaft of said stepping motor to said rotary member; and
 (d) aperture position detecting means for detecting whether the optical path hole has been opened to a given maximum aperture position by said light shielding blades, said detecting means having a detecting switch device for detecting the following states:
  (i) a stopped down aperture state wherein said detecting switch device is in a first switching condition,
  (ii) a maximum usable aperture state wherein said detecting switch device is at a change-over point from a first switching condition to a second switching condition, and
  (iii) a state of an aperture greater than the optical path hole wherein said detecting switch device is in the second switching condition, said states being established as a function of the rotating angle position of a rotary wheel included in a detecting gear transmission system to which the output rotation of said rotor shaft of said stepping motor is transmitted said detecting gear transmission system being arranged to have an output route different from said gear device, and said rotary wheel being arranged to rotate at a lower speed than said rotary shaft.

10. A device according to claim 9, wherein said detecting switch device of said detecting means is arranged such that the change-over point between the maximum aperture detection state and the stopped down aperture detection state is set between two stabilizing points of said stepping motor within which said stepping motor stabilized under a non-energizing condition.

11. A device according to claim 8, further comprising adjusting means for adjusting the detecting position of said detecting switch device of said detecting means, said adjusting means being arranged to adjust said detecting position for detecting the change over point on the basis of the rotating angle position of said rotary wheel.

12. A device according to claim 9, wherein the device is incorporated within an interchangeable lens.

13. A motor driven exposure adjusting device, comprising:
 (a) an annular rotary member having an optical path hole provided in a central portion of said member and arranged to be opened and closed by means of a plurality of light shielding blades, the opening and closing action of said blades being arranged to be controlled by the rotation of said rotary member;
 (b) a stepping motor having an axis thereof eccentrically located relative to a rotating center of said rotary member and disposed outside of the optical path hole, said stepping motor being arranged to serve as a drive source for the rotation of said rotary member;
 (c) a gear device for transmitting the output rotation of a rotor shaft of said stepping motor to said rotary member; and
 (d) aperture position detecting means for detecting whether the optical path hole has been opened to a given maximum aperture position by said light shielding blades, said detecting means having a detecting switch device for detecting the following states:
  (i) a stopped down aperture state wherein said detecting switch device is in a first switching condition,
  (ii) a maximum usable aperture state wherein said detecting switch device is at a change-over point from a second switching condition to a second switching condition, and
  (iii) a state of an aperture greater than the optical path hole wherein said detecting switch device is in the second switching condition, said states being established as a function of the rotating angle position of a rotary wheel to which the output rotation of said rotor shaft of said stepping motor is transmitted, said detecting switch device being arranged
  (d-1) to detect the change-over point between a maximum aperture detection state and a stopped down aperture detection state of the optical path hole defined by said light shielding blades, and
  (d-2) such that the change-over point between the maximum aperture detection state and the stopped down aperture detection state is set within a rotation range for a one-step period of said stepping motor within which said stepping motor stabilizes under a non-energized condition and that the change-over point is set to coincide with the phase of a current supply to be made during the one-step period.

14. A device according to claim 10, further comprising adjusting means for adjusting the detecting position of said detecting switch device.

15. A device according to claim 13, wherein the device is incorporated within an interchangeable lens.

* * * * *

UNITED STATES PATENT AND TRADEMARK OFFICE
CERTIFICATE OF CORRECTION

PATENT NO. : 4,922,274

DATED : May 1, 1990

INVENTOR(S) : YAMAMOTO, ET AL.

It is certified that error appears in the above-identified patent and that said Letters Patent is hereby corrected as shown below: Title page;

AT [73] Assignee:

"Assignee:" should read --Assignees:--.

COLUMN 3

Line 47, "shows" should read --show--.

COLUMN 7

Line 22, "$\theta=nP + \frac{1}{4} P,$" should read --$\theta=nP + \frac{1}{2} P,$--.

COLUMN 9

Line 29, "a" (first occurrence) should read --as--.
Line 39, "produce" should read --produces--.

COLUMN 10

Line 61, "which is" (first occurrence) should be deleted.
Line 63, "deivce" should read --device-- and "coil" should read --coils--.

COLUMN 11

Line 25, "mode" should read --made--.

COLUMN 19

Line 20, "because. One" should read --because one--.

UNITED STATES PATENT AND TRADEMARK OFFICE
CERTIFICATE OF CORRECTION

PATENT NO. : 4,922,274

DATED : May 1, 1990

INVENTOR(S) : YAMAMOTO, ET AL.

It is certified that error appears in the above-identified patent and that said Letters Patent is hereby corrected as shown below:

COLUMN 20

Line 23, "claim 2," should read --claim 1,--.
    Line 27, "change over" should read --change-over--.

COLUMN 22

Line 48, "arranged" should read --arranged;--.
    Line 63, "claim 10," should read --claim 13,--.

Signed and Sealed this

Fourth Day of August, 1992

Attest:

DOUGLAS B. COMER

*Attesting Officer*    *Acting Commissioner of Patents and Trademarks*